United States Patent
Bergstrom et al.

(10) Patent No.: US 10,922,719 B1
(45) Date of Patent: Feb. 16, 2021

(54) SYSTEMS AND METHODS FOR PROVIDING GROUP PROMOTIONS

(71) Applicant: Groupon, Inc., Chicago, IL (US)

(72) Inventors: Peter Bengt Karl Bergstrom, Mountain View, CA (US); Sebastian Heycke, San Francisco, CA (US); Adam J. Muhlbauer, Mountain View, CA (US); J. Gray Sandridge, Palo Alto, CA (US); Juhyeong Yu, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 1089 days.

(21) Appl. No.: 14/565,380

(22) Filed: Dec. 9, 2014

Related U.S. Application Data

(60) Provisional application No. 61/913,801, filed on Dec. 9, 2013, provisional application No. 61/948,496, filed on Mar. 5, 2014.

(51) Int. Cl.
 *G06Q 50/00* (2012.01)
 *G06Q 30/02* (2012.01)
(52) U.S. Cl.
 CPC .............. *G06Q 30/0257* (2013.01)
(58) Field of Classification Search
 CPC ........................................... G06F 9/44
 USPC ........................................... 705/14
 See application file for complete search history.

(56) References Cited

U.S. PATENT DOCUMENTS

| | | | |
|---|---|---|---|
| 4,876,592 A | 10/1989 | Von Kohorn | |
| 5,025,372 A | 6/1991 | Burton et al. | |
| 5,053,957 A | 10/1991 | Suzuki | |
| 5,056,019 A | 10/1991 | Schultz et al. | |
| 5,287,268 A | 2/1994 | McCarthy | |
| 5,297,026 A | 3/1994 | Hoffman | |
| 5,466,919 A | 11/1995 | Heintzeman et al. | |
| 5,537,314 A | 7/1996 | Kanter | |

(Continued)

OTHER PUBLICATIONS

Group Buying Websites Business:Model Analysis and Evaluation of Greek Cases, by Retzepi Nikoleta, Oct. 2011, p. 67 (Year: 2011).*

(Continued)

*Primary Examiner* — John Van Bramer
*Assistant Examiner* — Darnell A Pouncil
(74) *Attorney, Agent, or Firm* — Alston & Bird LLP

(57) ABSTRACT

Systems, apparatus, and methods for providing promotion to networked consumer device groups are discussed herein. Some embodiments may include a system including one or more servers with processing circuitry configured to provide consumer interfaces to consumer devices that facilitate the sharing of a group promotion via a network between the consumer devices. The sharing may include the creation of the group promotion, the transmission of the group promotion to consumers via various communication channels, the tracking of consumer activity toward a group discount, among other things. For example, subsequent to purchase of a promotion via a consumer device, the processing circuitry may provide a sharing channel display to the consumer device for consumer selection of a communication channel for sharing the group promotion. The processing circuitry may create an impression of the group promotion compatible with the selected communication channel and provide the impression to other consumer devices.

18 Claims, 22 Drawing Sheets

(56) References Cited

U.S. PATENT DOCUMENTS

| | | |
|---|---|---|
| 5,621,640 A | 4/1997 | Burke |
| 5,649,116 A | 7/1997 | McCoy et al. |
| 5,710,886 A | 1/1998 | Christensen et al. |
| 5,806,045 A | 9/1998 | Biorge et al. |
| 6,014,645 A | 1/2000 | Cunningham |
| 6,018,718 A | 1/2000 | Walker et al. |
| 6,101,484 A | 8/2000 | Halbert et al. |
| 6,128,599 A | 10/2000 | Walker et al. |
| 6,260,024 B1 | 7/2001 | Shkedy |
| 6,332,126 B1 | 12/2001 | Peirce et al. |
| 6,965,869 B1 | 11/2005 | Tomita et al. |
| 2007/0179885 A1 | 8/2007 | Bird et al. |
| 2008/0040172 A1* | 2/2008 | Watkins ............... G06Q 10/02 705/5 |
| 2009/0132366 A1 | 5/2009 | Lam et al. |
| 2009/0327308 A1 | 12/2009 | Carter et al. |
| 2010/0211452 A1 | 8/2010 | D'Angelo et al. |
| 2010/0287044 A1 | 11/2010 | Mason |
| 2011/0047012 A1* | 2/2011 | Sherman ............... G06Q 10/10 705/14.1 |
| 2011/0251880 A1 | 10/2011 | Butler et al. |
| 2011/0010234 A1 | 11/2011 | Lindelsee et al. |
| 2012/0215597 A1 | 8/2012 | Ross |
| 2012/0303435 A1 | 11/2012 | Rawat et al. |
| 2013/0006738 A1 | 1/2013 | Horvitz et al. |
| 2013/0103481 A1 | 4/2013 | Carpenter et al. |
| 2013/0275200 A1* | 10/2013 | Alkatib ............... G06Q 30/0226 705/14.33 |
| 2014/0351033 A1* | 11/2014 | Azevedo ............ G06Q 30/0222 705/14.19 |
| 2015/0066614 A1* | 3/2015 | Gilmartin .......... G06Q 30/0212 705/14.14 |

OTHER PUBLICATIONS

Glaser, Martha, "Buying Groups What Have You Done for Me Lately," Drug Topics, Jun. 8, 1992, vol. 136, No. 11, pp. 48-51, ISSN: 0012-6616.

* cited by examiner

3000

Order Details

| Description | Quantity | Price | Total |
|---|---|---|---|
| Promotion | 1 x | $3 = | $3.00 |

☐ Use a promotion or gift code

My Price: $3.00

Account Information

Pay with Existing Card

○ Card 1
○ Card 2

Use new card

Pay purchase value now and receive $1 group discount when group sale threshold of 5 consumers is satisfied — 3004

☒ Share this purchase on my social network

[Complete Order] — 3002

FIG. 30

SYSTEMS AND METHODS FOR PROVIDING GROUP PROMOTIONS

CROSS-REFERENCE TO RELATED APPLICATIONS

This application claims the benefit of U.S. Provisional Patent Application No. 61/913,801, titled "Systems and Methods for Providing Group Promotions," filed Dec. 9, 2013, and U.S. Provisional Patent Application No. 61/948,496, titled "Systems and Methods for Providing Group Promotions," filed Mar. 5, 2014, each of which is incorporated by reference herein in its entirety.

FIELD

Embodiments of the invention relate, generally, to techniques for providing electronic promotional data to groups of networked consumer devices.

BACKGROUND

Via electronic networks (e.g., the Internet), promotional systems provide promotions associated with merchants to consumer devices. Oftentimes, two or more of the consumers may be interested in participating in a promotion as a group. In this regard, areas for improving current systems have been identified.

BRIEF SUMMARY

Through applied effort, ingenuity, and innovation, solutions to improve such systems have been realized and are described herein. Some embodiments may provide for a system and/or apparatus configured to provide a promotion to a consumer group including multiple consumers. For example, the system may include one or more servers with communication circuitry and processing circuitry. The communication circuitry may be configured to connect with consumer devices via a network. The processing circuitry may be configured to: provide, via the network and to a consumer device, a consumer interface including a promotion display with an interactive buy button; in response to receiving, from the consumer device and via the network, first consumer device input data indicating a selection of the interactive buy button within the promotion display: provide a checkout display to the consumer interface of the consumer device, the checkout display including a complete order button; in response to receiving, from the consumer device and via the network, second consumer device input data indicating a selection of the complete order button via the checkout display, complete a purchase of the promotion; subsequent to completing the purchase of the promotion, provide a sharing channel display to the consumer interface via the network; receive, via the network and from the consumer device, a selection of a communication channel for sharing the group promotion; create an impression of the group promotion compatible with the selected communication channel; and provide the impression to the consumer interface of the consumer device via the network.

In some embodiments, the impression may include an electronic reference to an ungated group promotion display. The ungated group promotion display may be accessible by consumer devices unassociated with a consumer account.

Some embodiments may provide for system including one or more servers with processing circuitry configured to: associate a group promotion identifier with a first consumer account associated with a first consumer device; generate a group promotion event interface associated with the group promotion identifier; provide, via the network, the group promotion identifier to the first consumer device; receive, via the network, an indication of the group promotion identifier from a second consumer device; in response to receiving the group promotion identifier from the second consumer device: determine a second consumer account associated with the second consumer device; and provide access to the group promotion event interface to the second consumer account. The processing circuitry may be further configured to: receive, via the network, a promotion purchase request from the second consumer device generated via consumer device inputs to the promotion event interface; and in response to receiving the promotion purchase request, transmit, via the network, a promotion purchase notification to one or more of the first consumer device and the second consumer device.

Some embodiments may provide for system including one or more servers with processing circuitry configured to: associate a group promotion identifier with a group promotion; receive the group promotion identifier from a consumer device; and in response to receiving the group promotion identifier from the consumer device: determine a consumer account associated with the consumer device; and associate the consumer account with the group promotion.

Some embodiments may provide for system including one or more servers with processing circuitry configured to: generate the group promotion event interface associated with a group promotion; provide, via the network, the group promotion event interface to the consumer devices; receive, via the network, a promotion purchase request for the group promotion from a consumer device; and in response to receiving the promotion purchase request, provide a promotion purchase notification to the group promotion event interface via the network.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
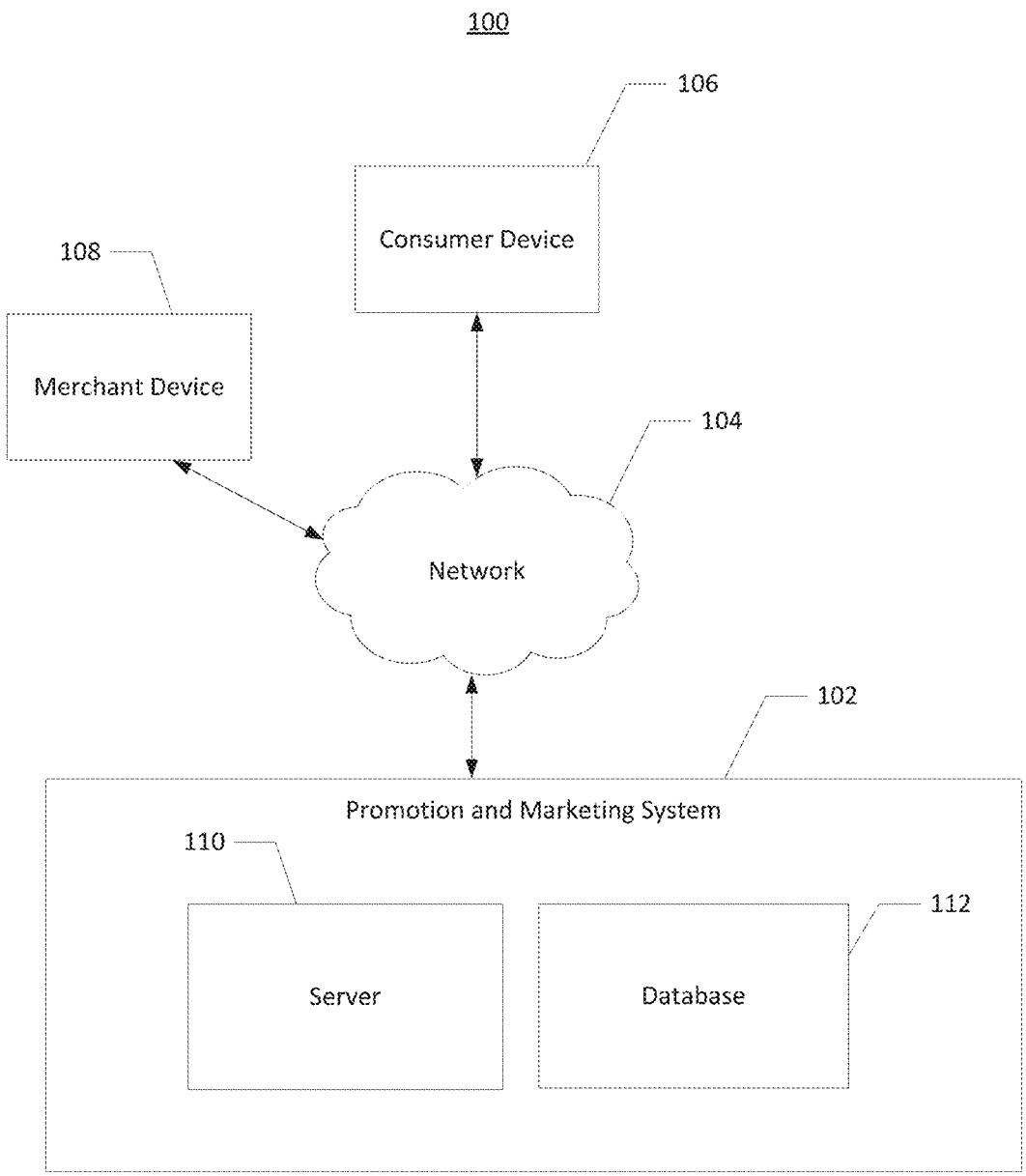
Figure 2:
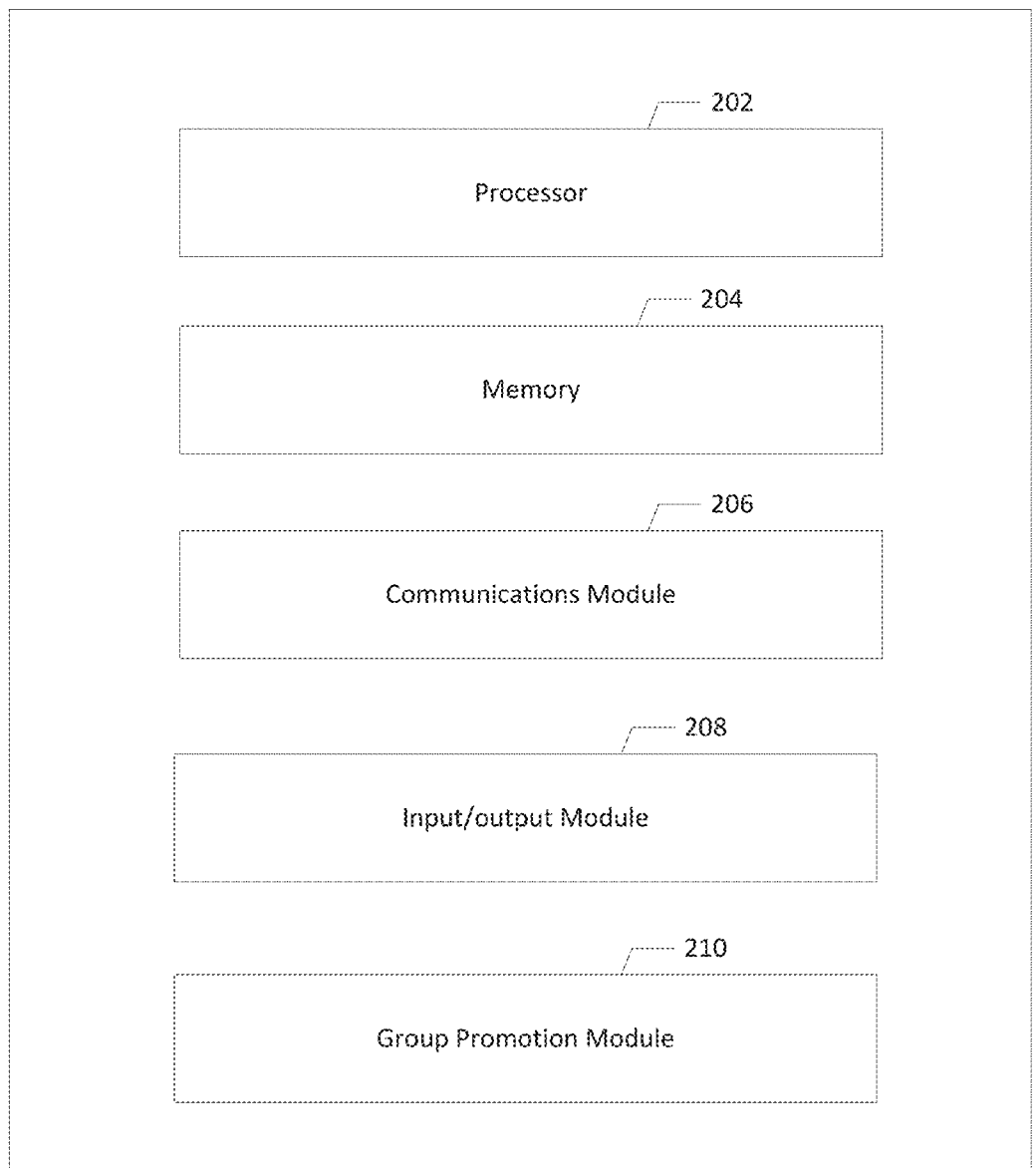
Figure 3:
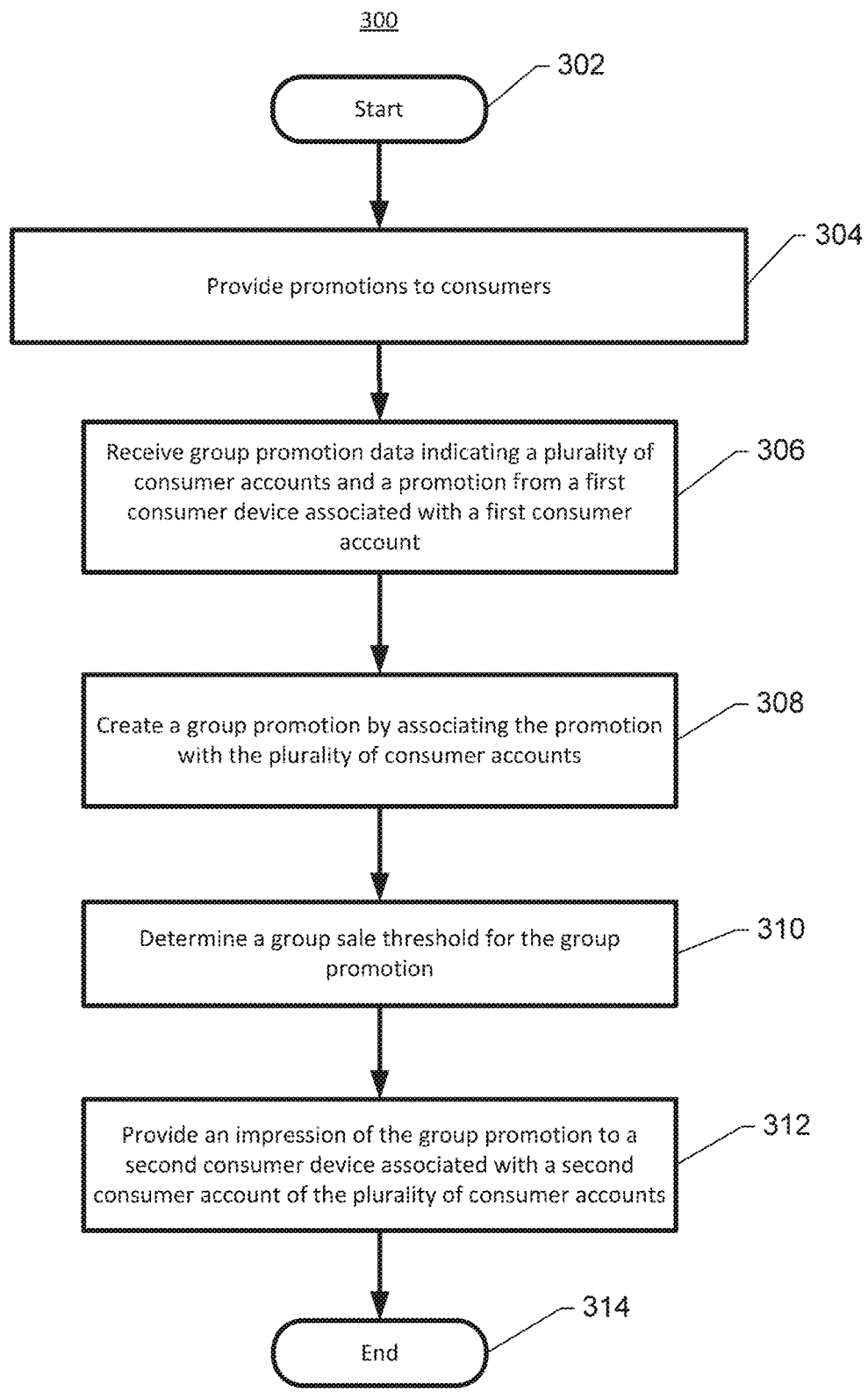
Figure 4:
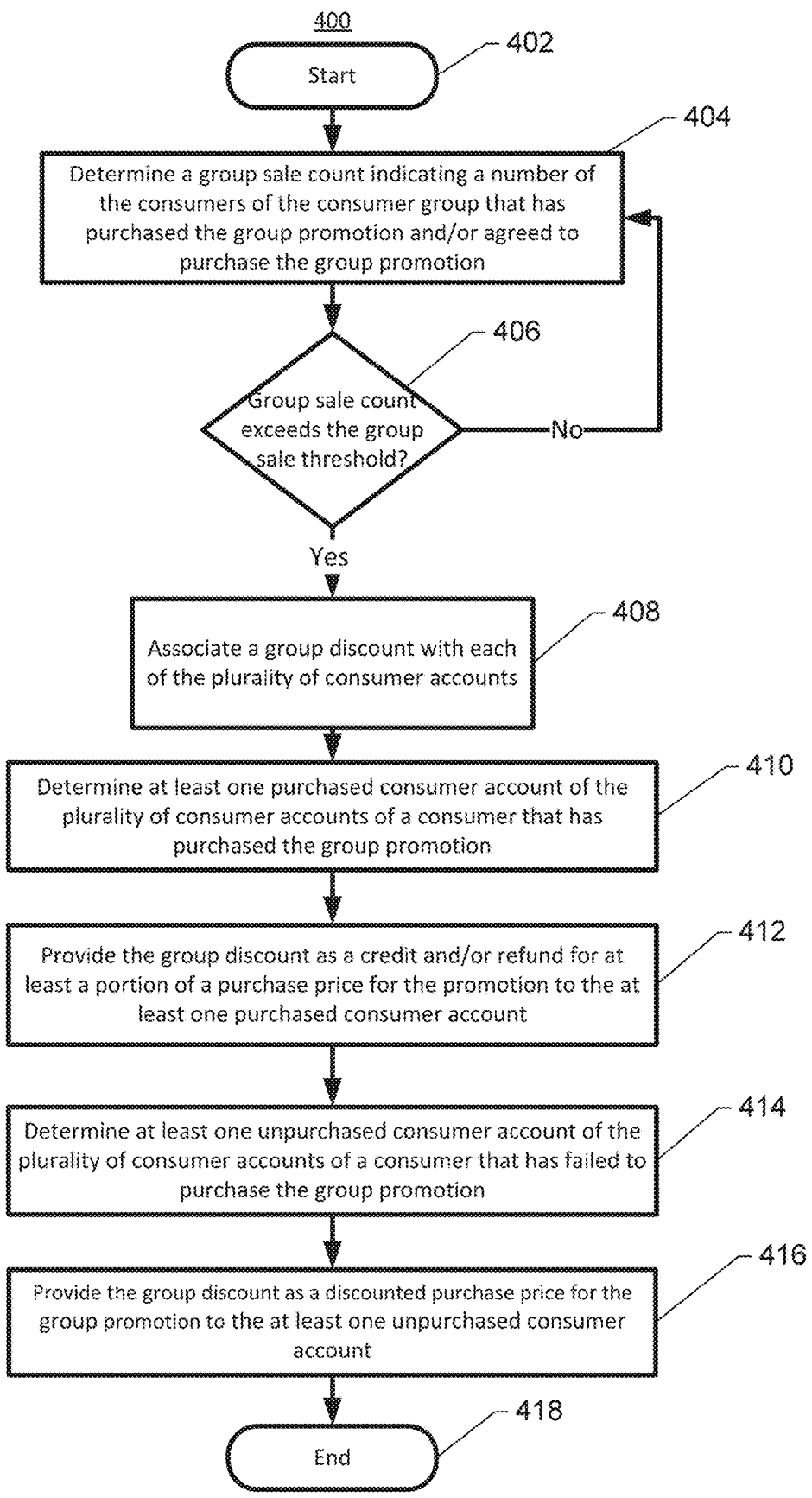
Figure 5:
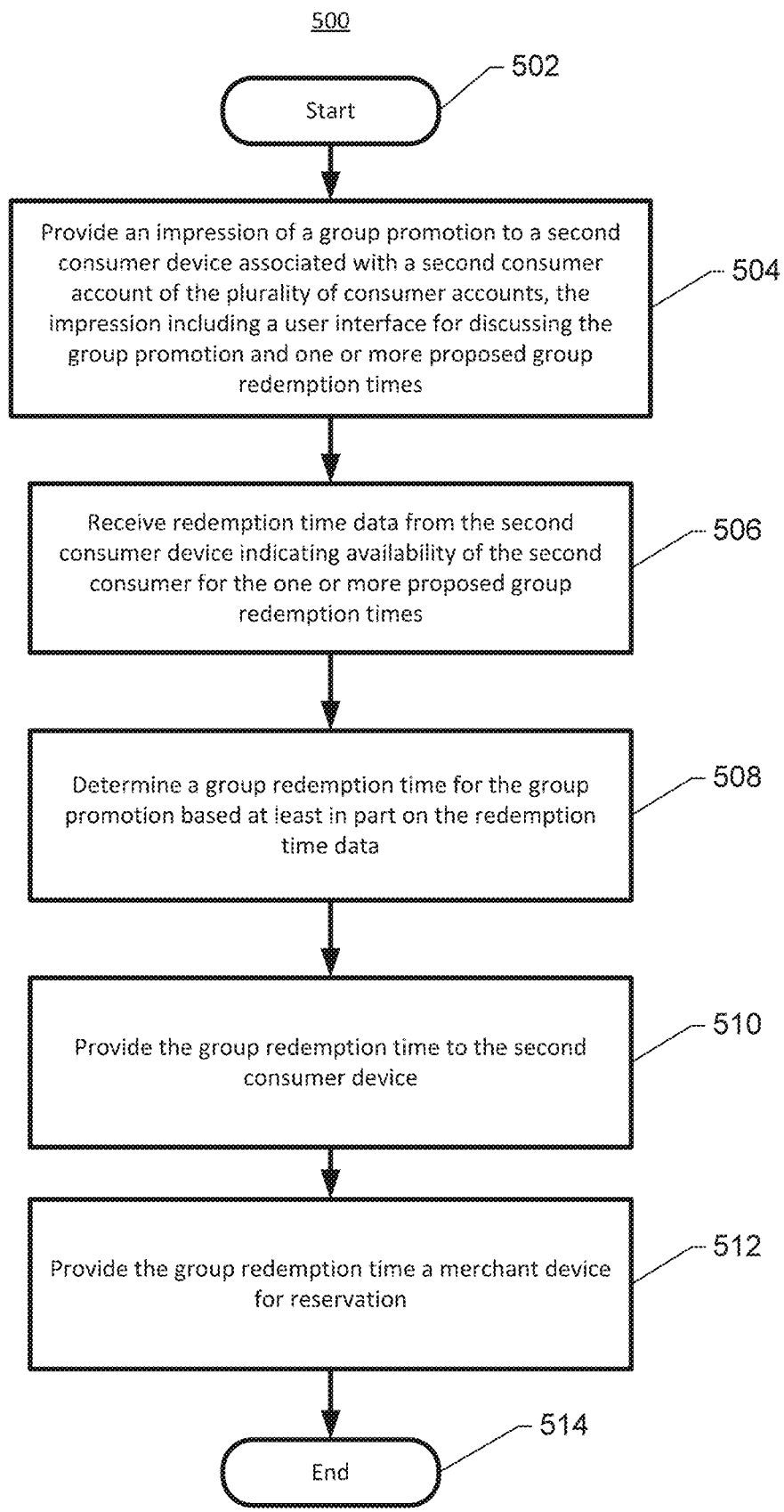
Figure 6:
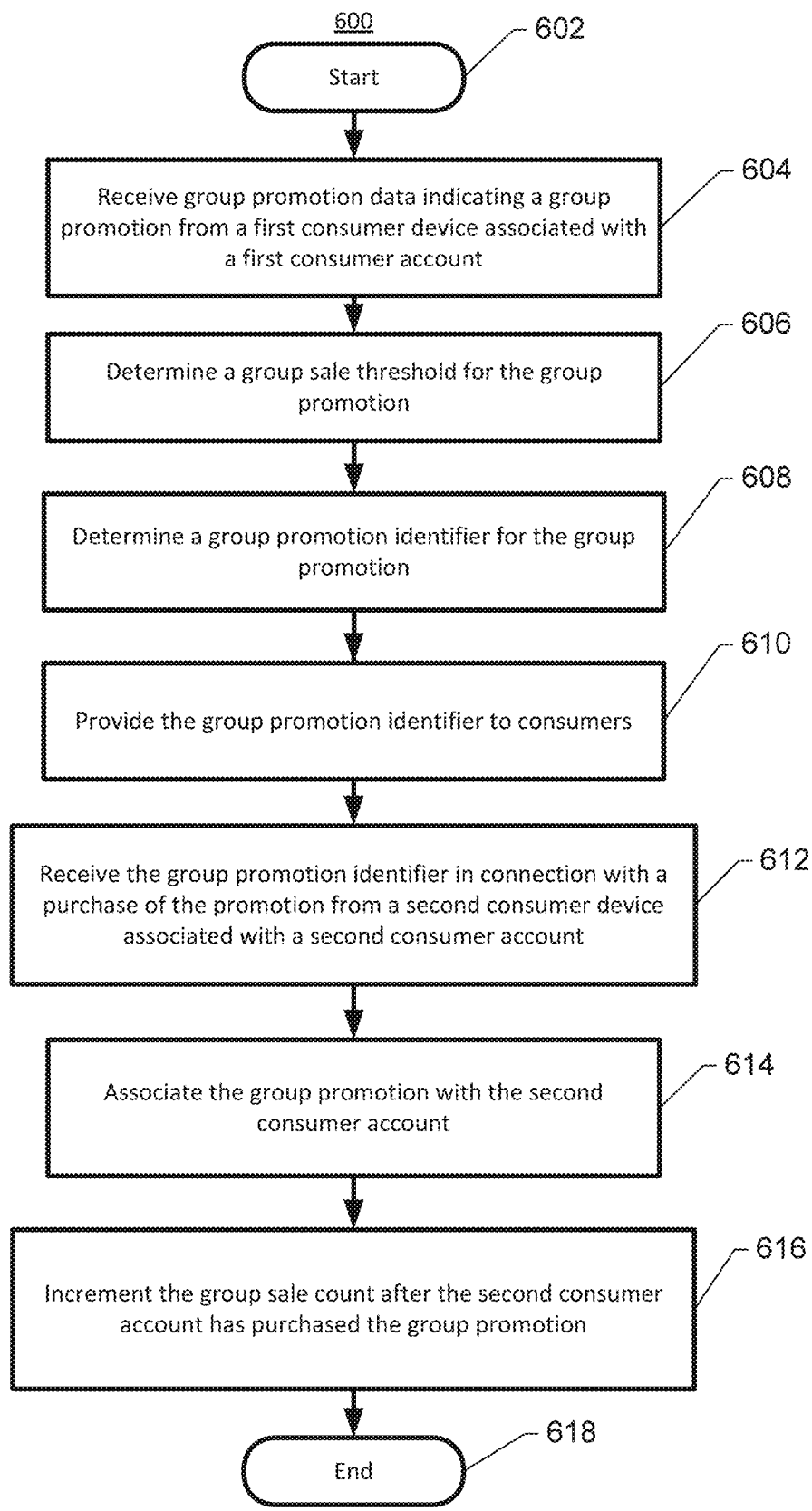
Figure 7:
Figure 8:
Figure 9:
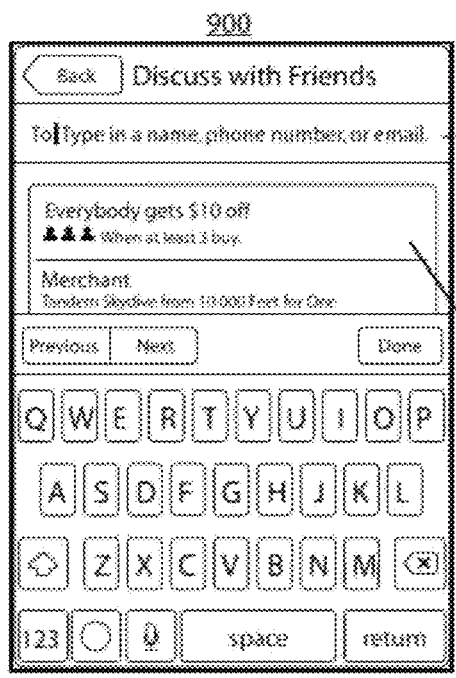
Figure 10:
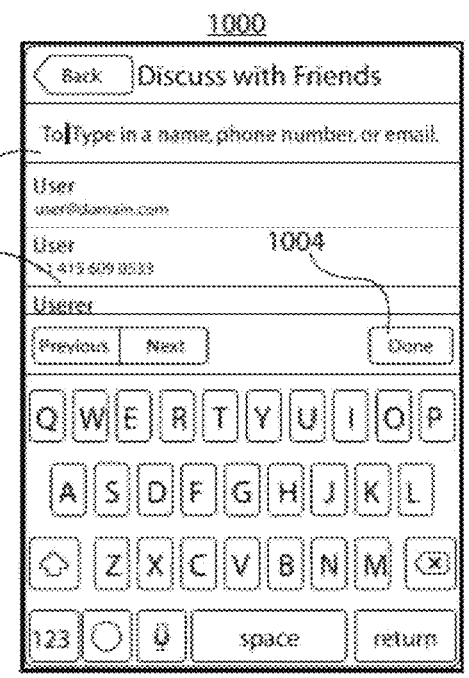
Figure 11:
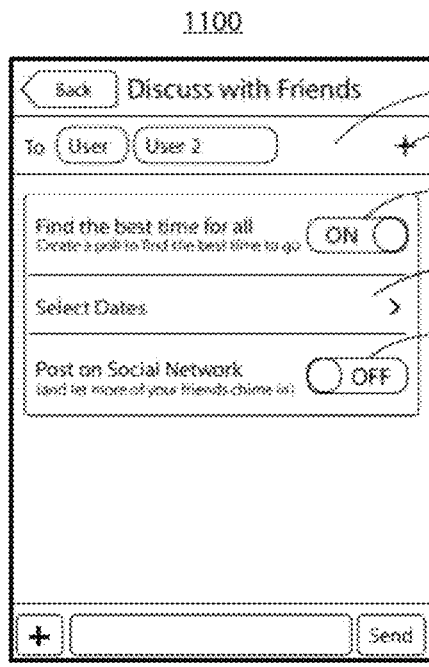
Figure 12:
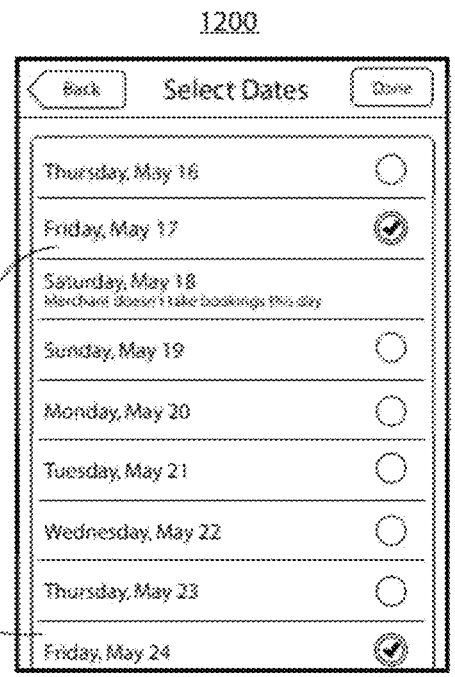
Figure 13:
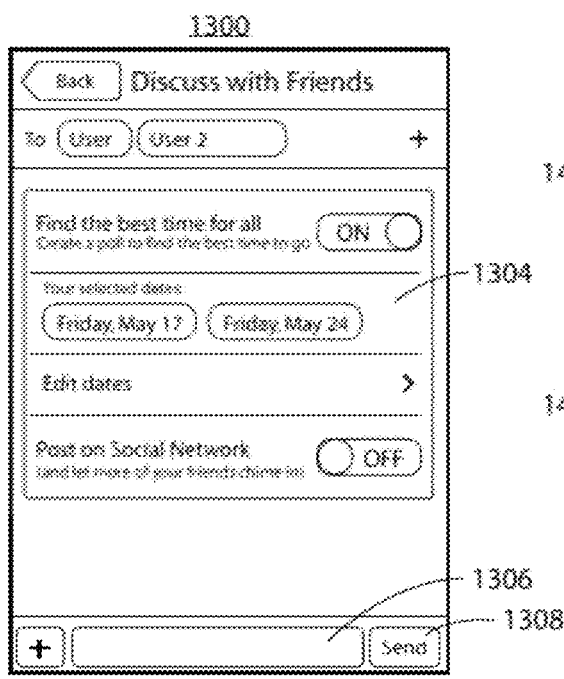
Figure 14:
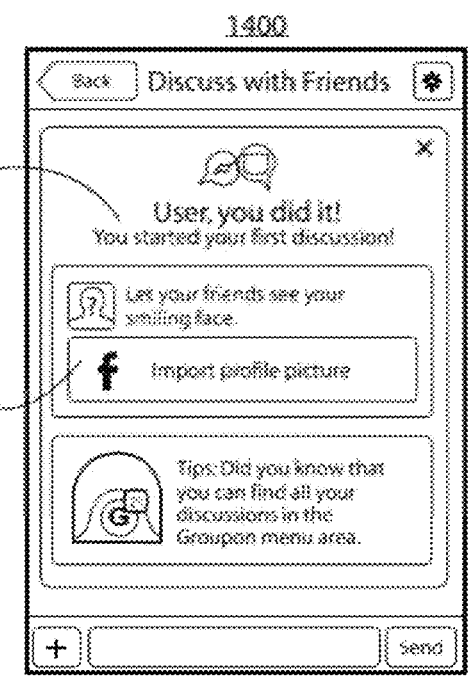
Figure 15:
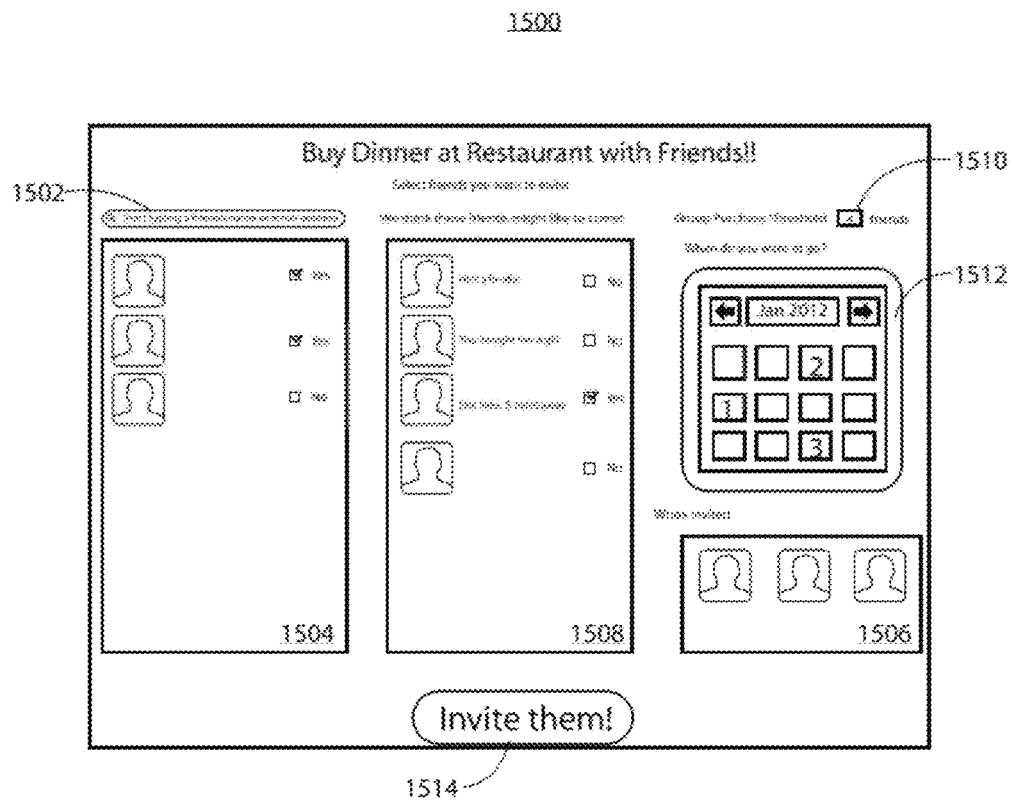
Figures 16, 17:
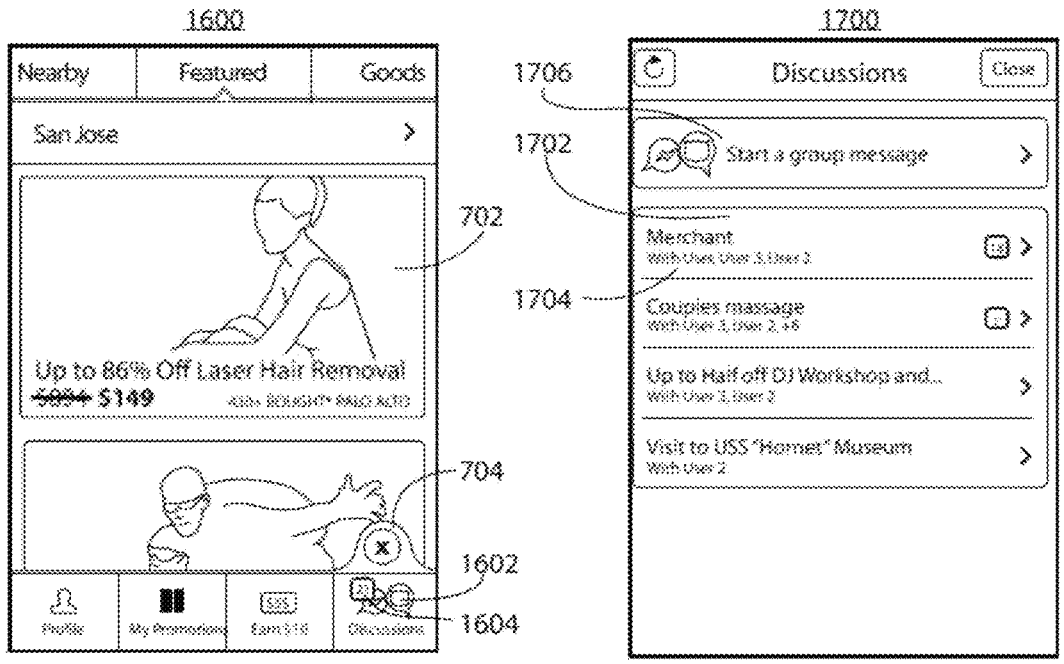
Figure 18:
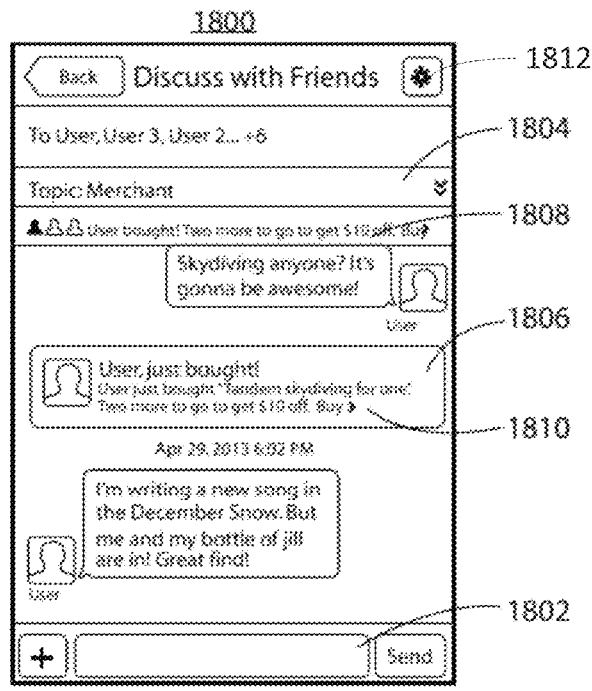
Figure 19:
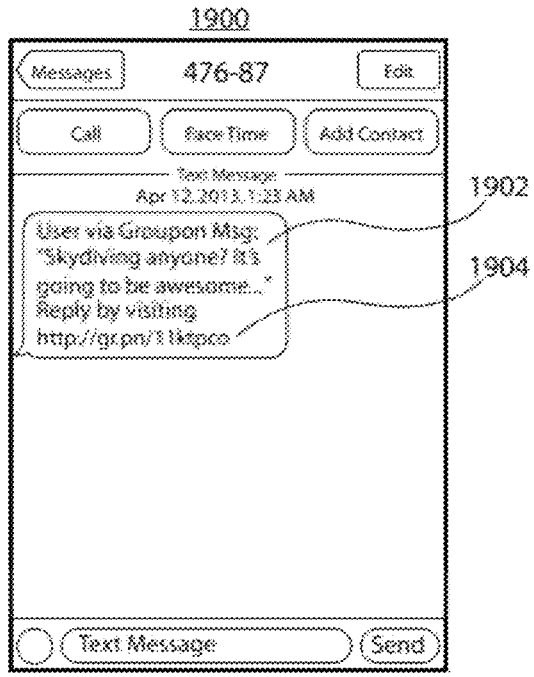
Figure 20:
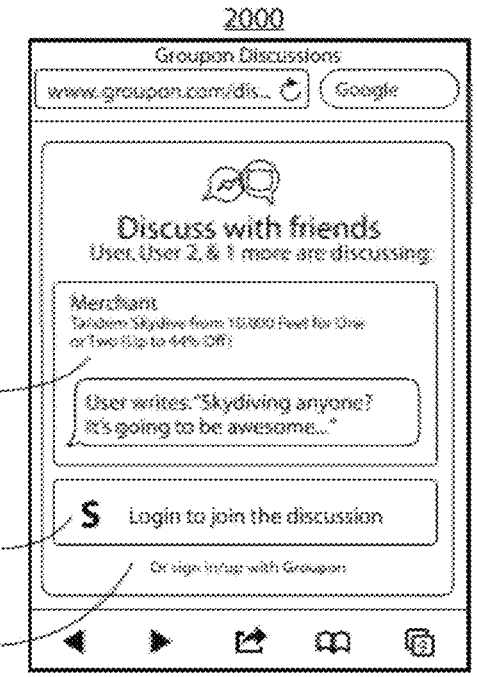
Figure 21:
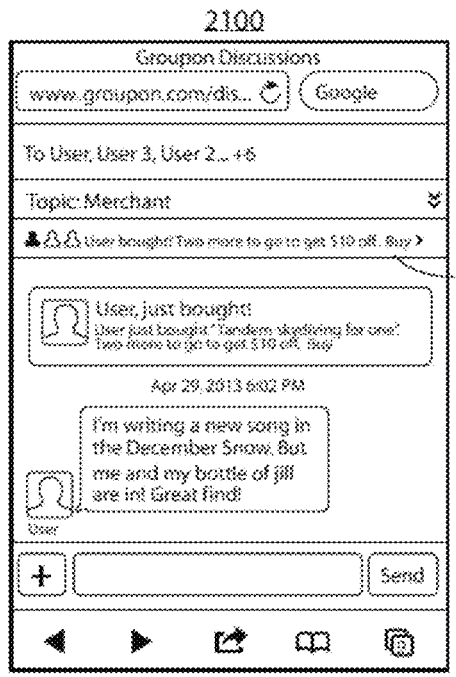
Figure 22:
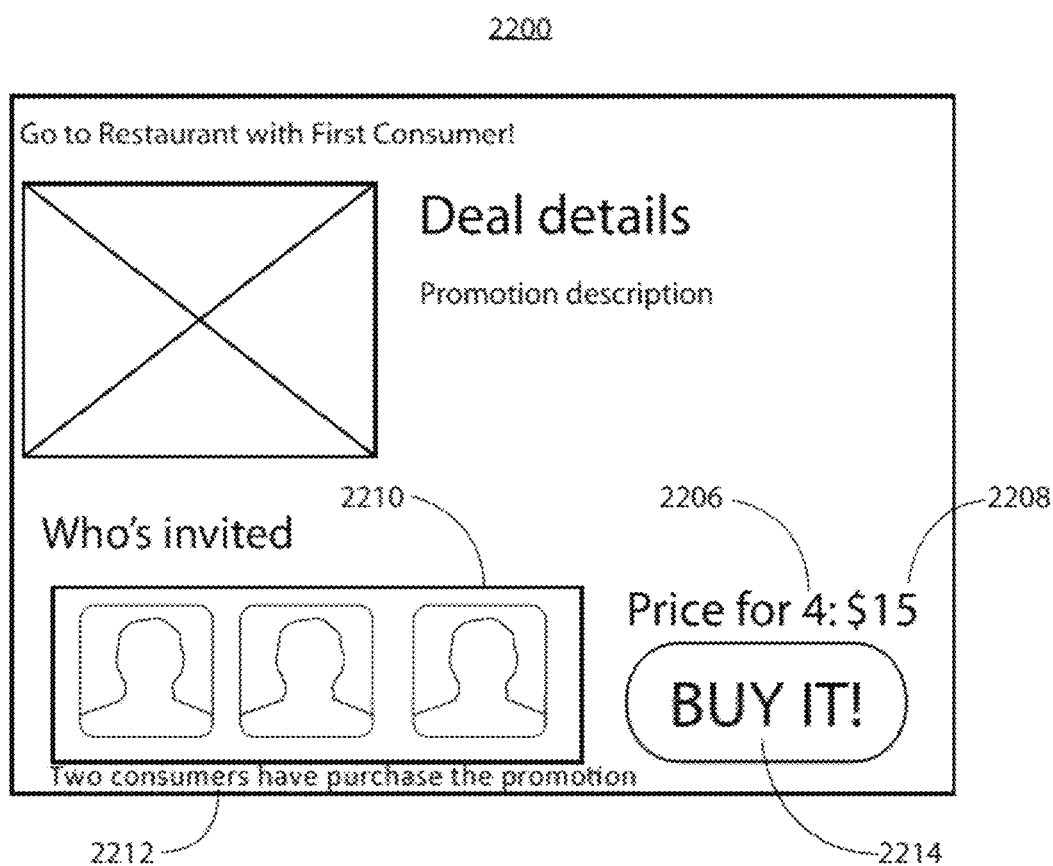
Figure 23:
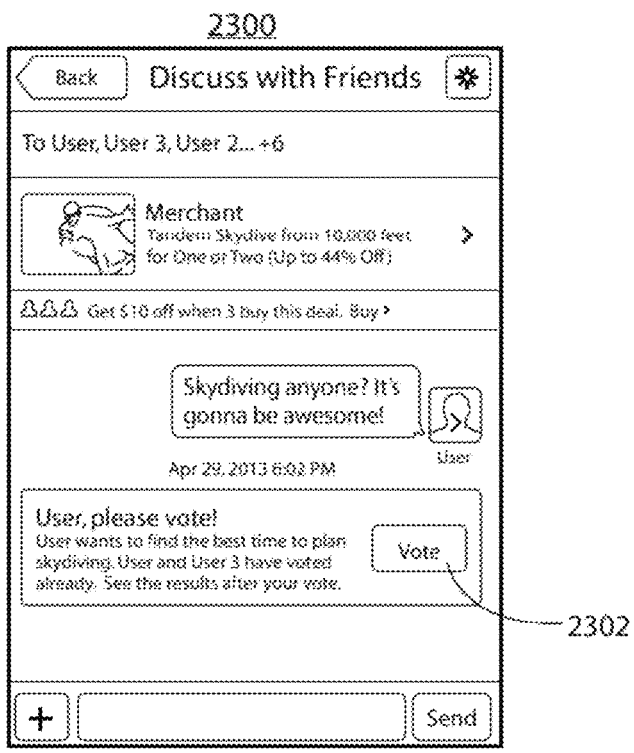
Figure 24:
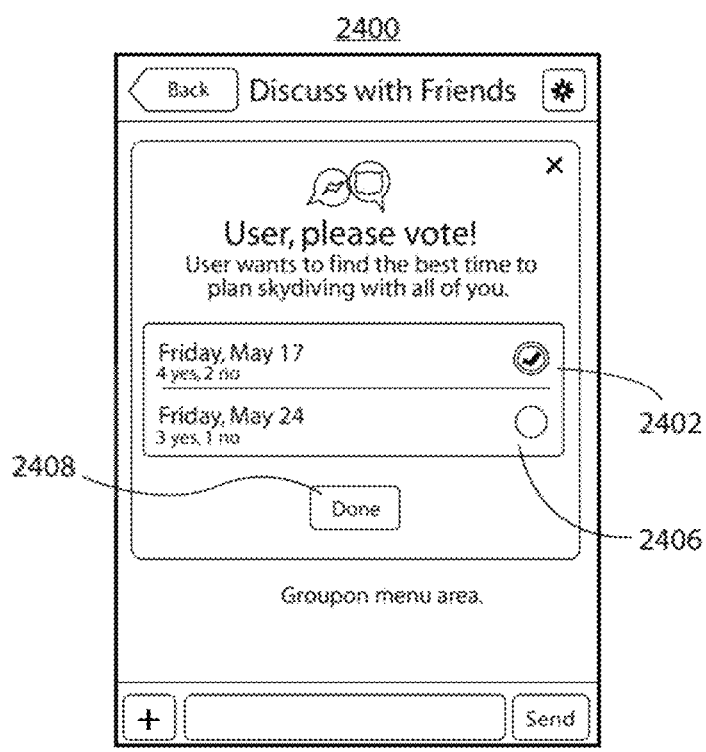
Figure 25:
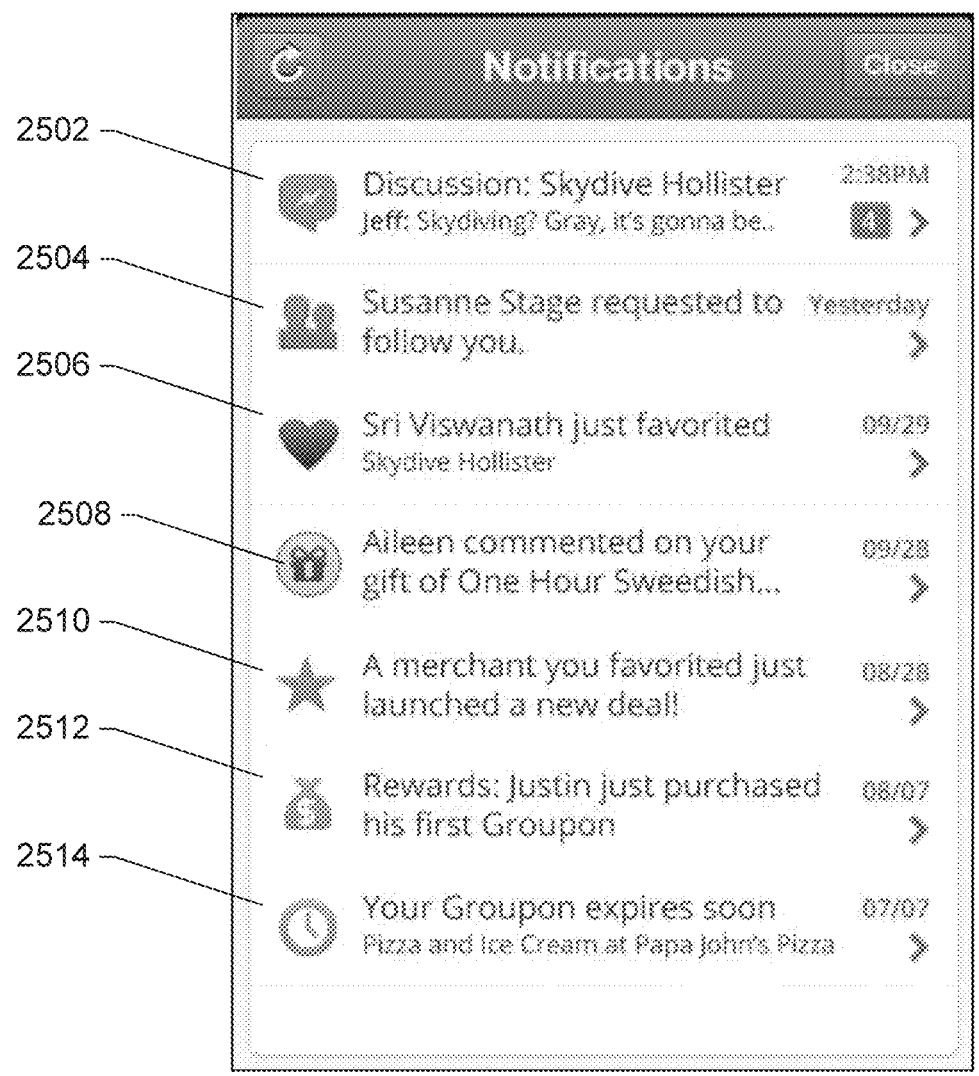
Figure 26:
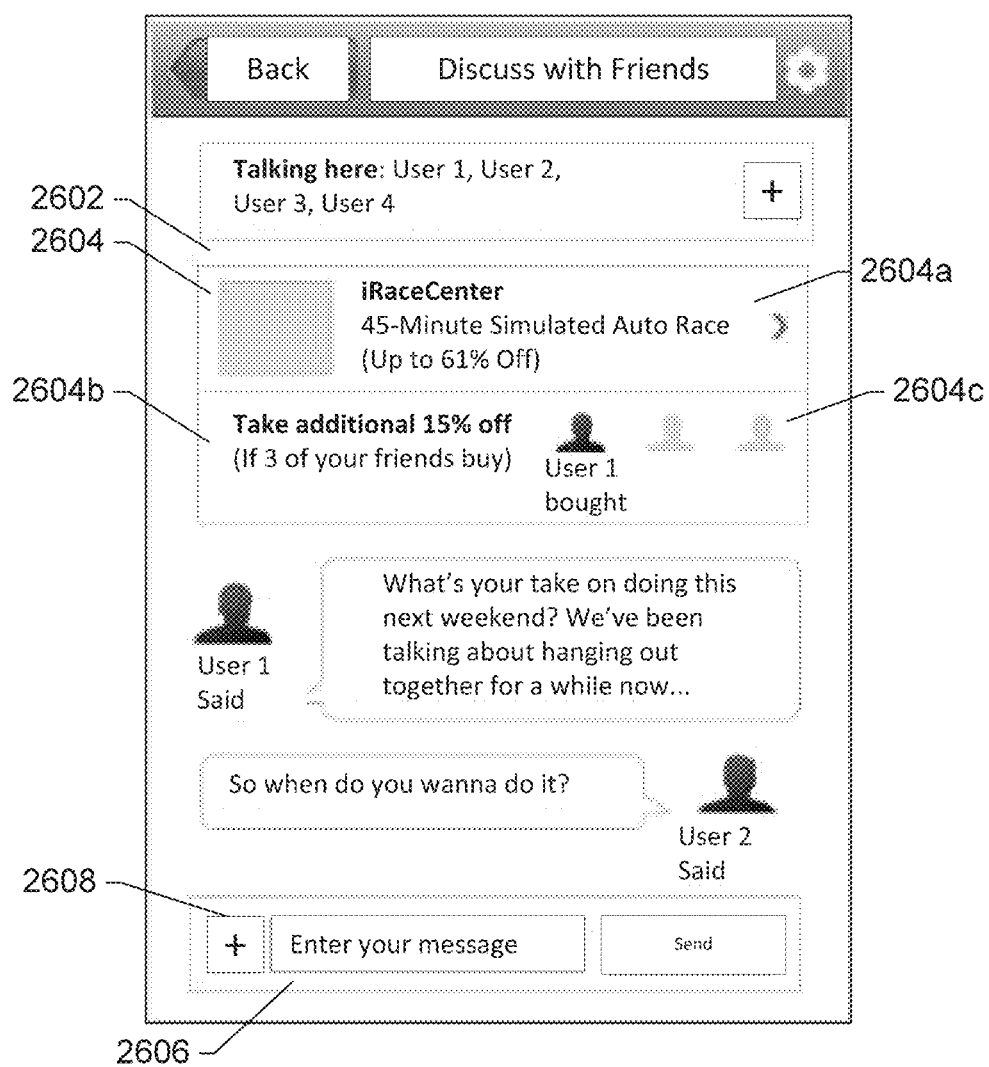
Figure 27:
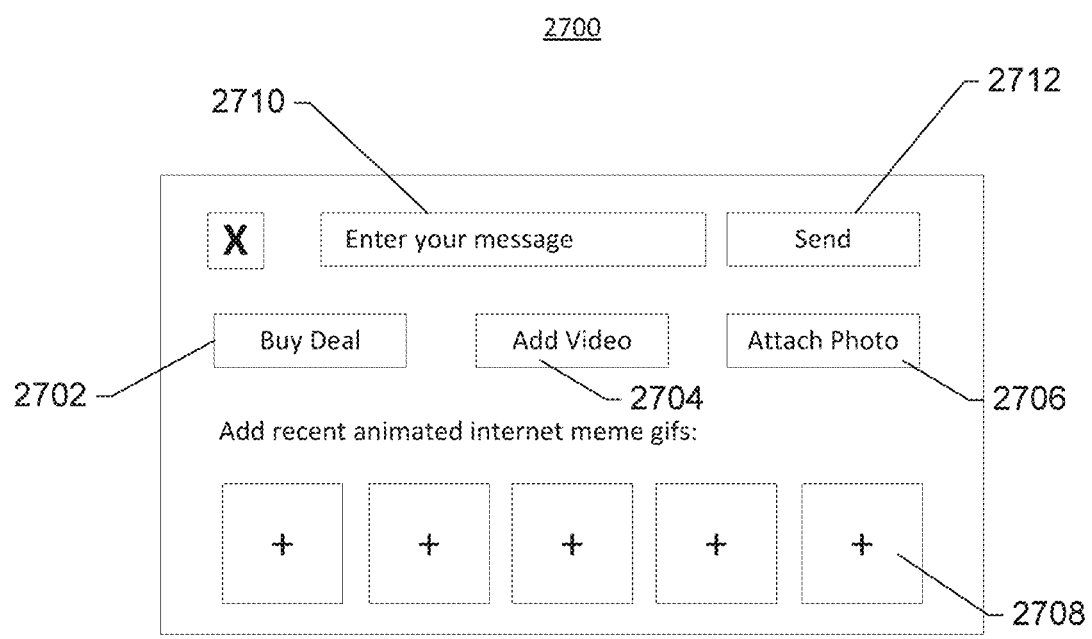
Figure 28:
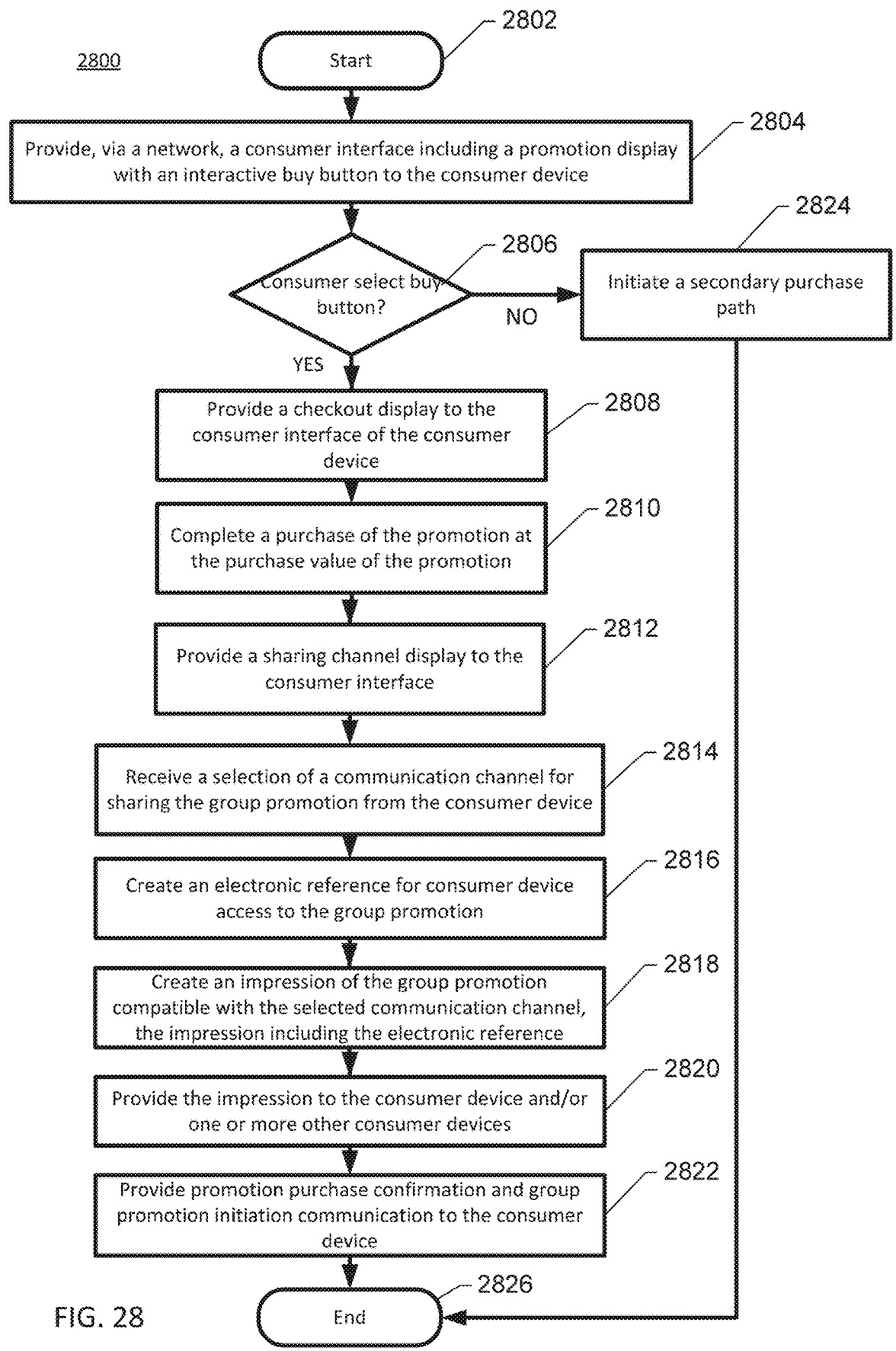
Figure 29:
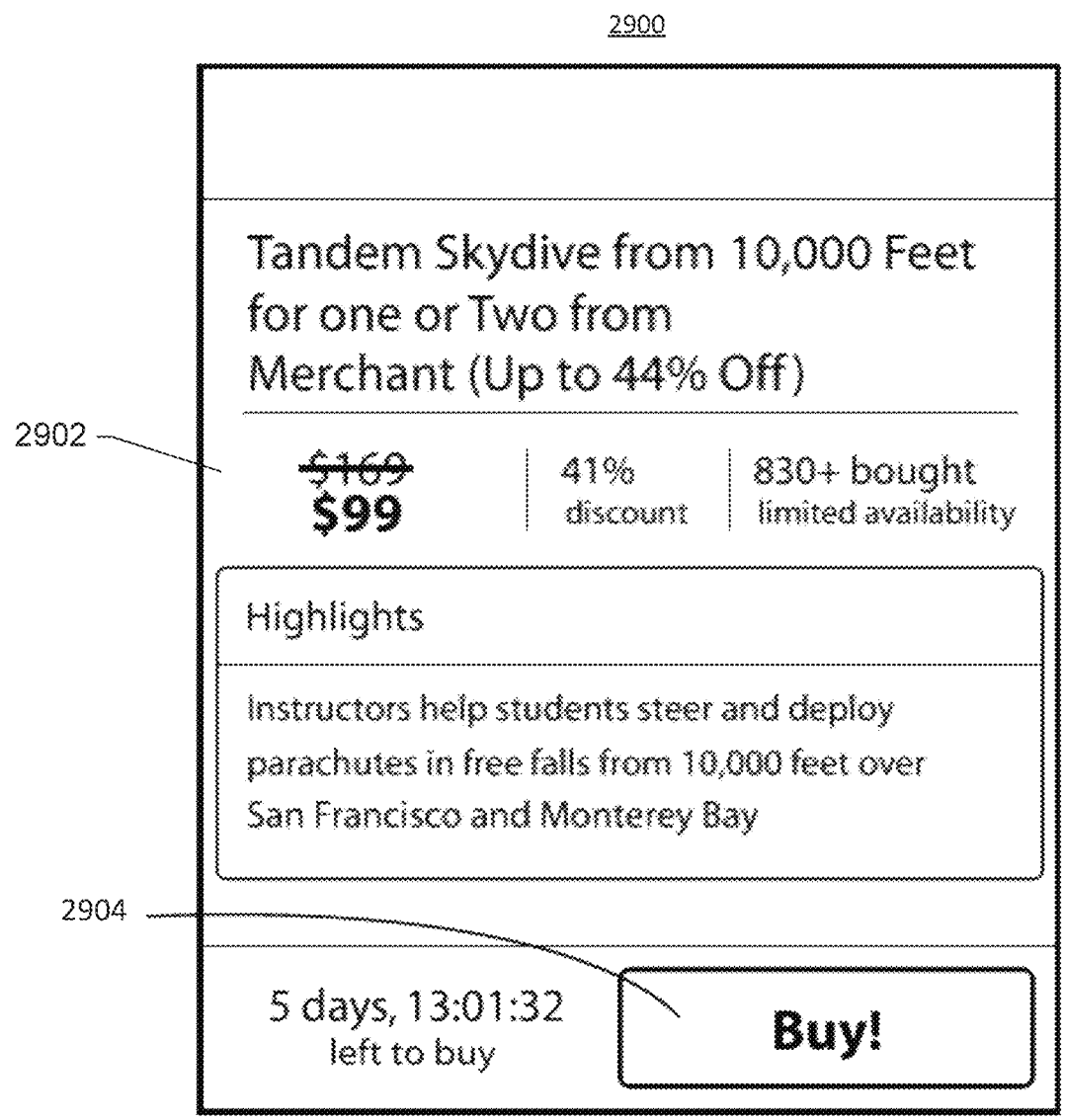
Figure 31:
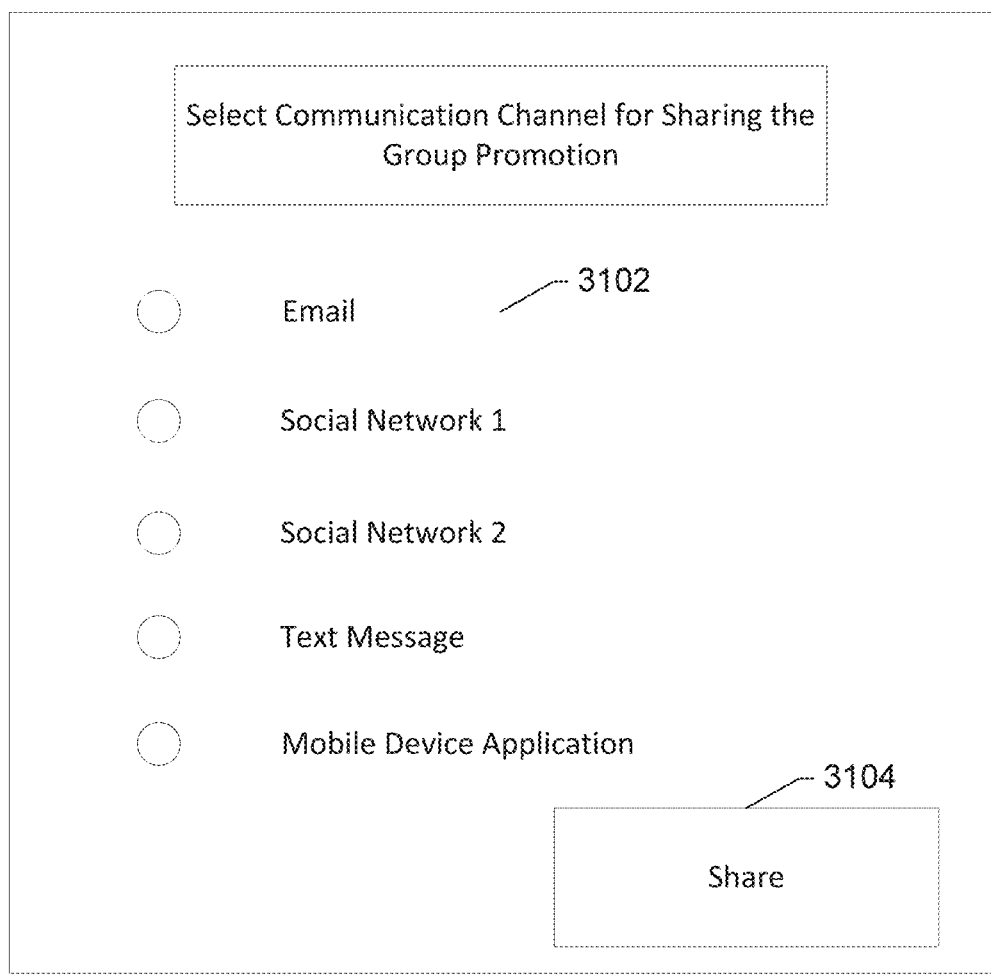
Figure 32:
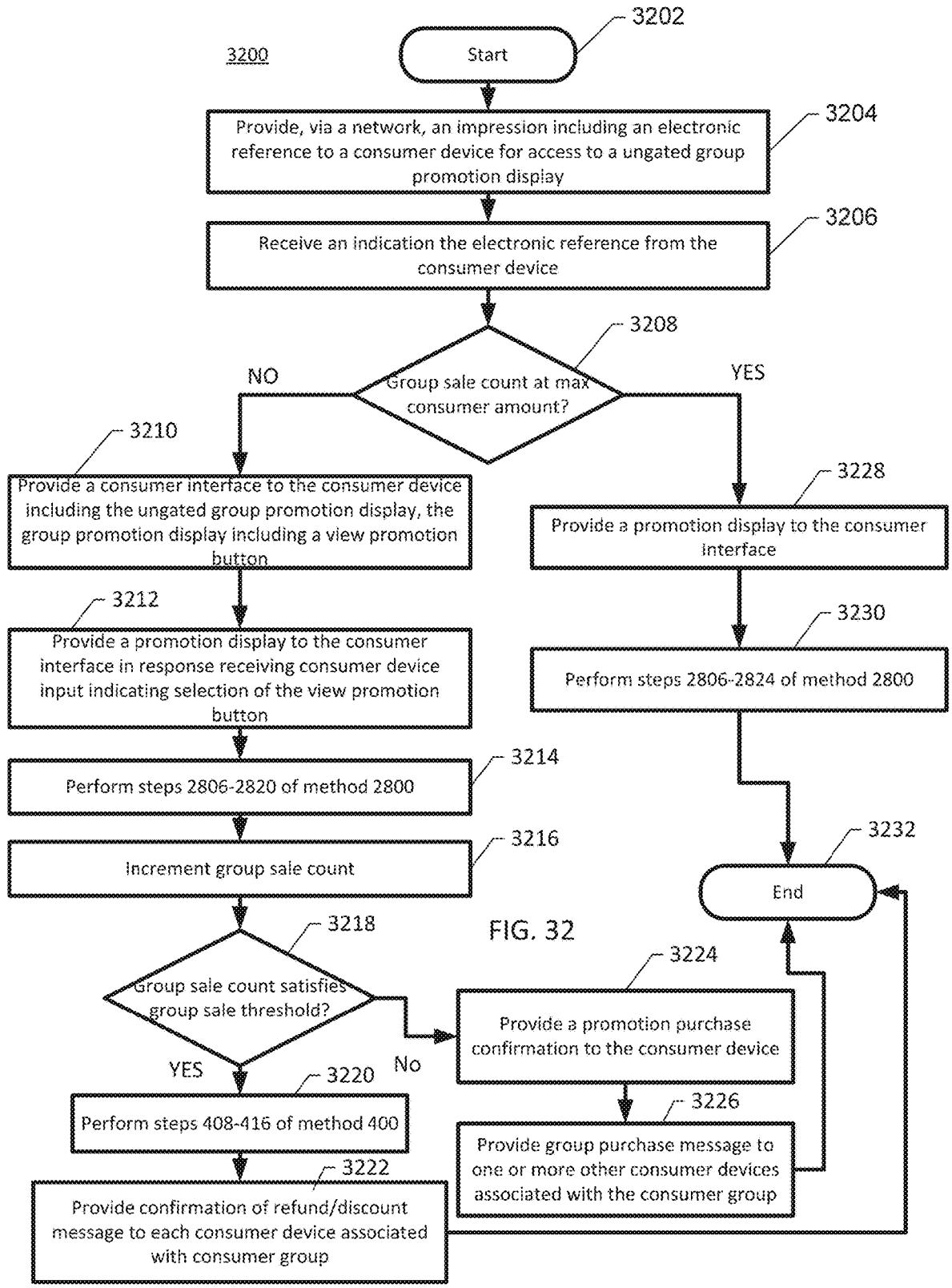
Figure 33:
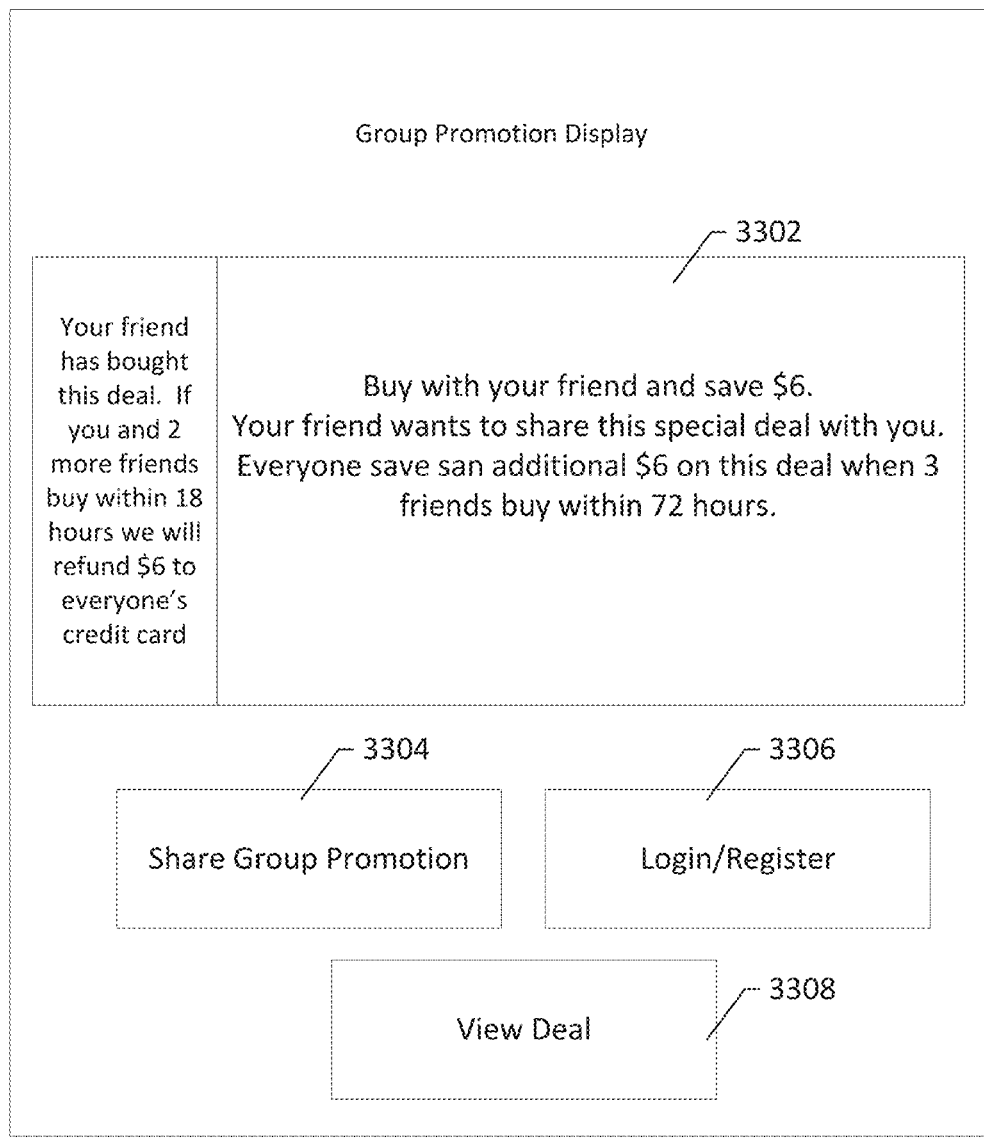

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example of a method for providing a group promotion to a consumer group in accordance with some embodiments;

FIG. 4 shows an example of a method for providing a group discount of a group promotion in accordance with some embodiments;

FIG. 5 shows an example of a method for determining a group redemption time based on a poll, in accordance with some embodiments;

FIG. 6 shows an example of a method for providing a group promotion to a consumer group based on a group promotion identifier in accordance with some embodiments;

FIG. 7 shows an example of an impression in accordance with some embodiments;

FIG. 8 shows an example promotion display in accordance with some embodiments;

FIGS. 9 and 10 show example add consumer displays in accordance with some embodiments;

FIG. 11 shows an example group promotion creation display in accordance with some embodiments;

FIG. 12 shows an example redemption date listing in accordance with some embodiments;

FIG. 13 shows group promotion creation display including one or more proposed group redemption times in accordance with some embodiments;

FIG. 14 shows group promotion creation display including one or more proposed group redemption times in accordance with some embodiments;

FIG. 15 shows an example group promotion creation display in accordance with some embodiments;

FIG. 16 shows an example consumer application home display in accordance with some embodiments;

FIG. 17 shows an example group promotion membership display in accordance with some embodiments;

FIG. 18 shows an example group discussion interface, in accordance with some embodiments;

FIG. 19 shows an example of a text message in accordance with some embodiments;

FIG. 20 shows an example impression in accordance with some embodiments;

FIG. 21 shows an example group discussion interface in accordance with some embodiments;

FIG. 22 shows an example impression in accordance with some embodiments;

FIG. 23 shows an example group discussion interface in accordance with some embodiments;

FIG. 24 shows an example polling interface in accordance with some embodiments;

FIG. 25 shows an example notification display in accordance with some embodiments;

FIG. 26 shows an example group discussion interface in accordance with some embodiments;

FIG. 27 shows an example expanded message input display in accordance with some embodiments;

FIG. 28 shows an example of a method for providing a group promotion as part of a primary purchase path of a consumer device user interface in accordance with some embodiments;

FIG. 29 shows an example of a promotion display in accordance with some embodiments;

FIG. 30 shows an example of a checkout display in accordance with some embodiments;

FIG. 31 shows an example of a sharing channel display in accordance with some embodiments;

FIG. 32 shows an example of a method for providing a group promotion to a consumer group based on an electronic reference in accordance with some embodiments; and FIG. 33 shows an example of an ungated group promotion display in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

BRIEF OVERVIEW

Methods, systems, apparatus and computer program products described herein are operable for providing promotions to consumer groups. A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion.

In some embodiments, consumers may be allowed to define a group promotion for sharing with other consumers. A "group promotion," as used herein, refers to a promotion that has been associated with a consumer group. For example, the system may be configured to receive group promotion data that defines the group promotion, such as the underlying promotion of the group promotion and/or the members of the consumer group to be associated with the group promotion.

Some embodiments may provide for group planning capabilities from end-to-end, such as from discovery of the promotion by a first consumer, to invitation of other consumers to participate in the group promotion, to facilitating payments, and finally to making reservations (e.g., at a dine-in restaurant) when appropriate. For example, in some embodiments, a system may be configured to provide user interfaces to consumer devices that allow consumers to discuss the group promotion. For example, consumers can post messages and receive messages from other consumers via a discussion or message feed interface, such as for planning and organizing activities where group promotions can be redeemed as a group (e.g., a promotion for dinner at a dine-in restaurant). In some embodiments, the system may be configured to facilitate the planning. For example, a poll including one or more proposed group redemption times may be sent to consumers of the consumer group and a group redemption time may be determined based on the answers provided by the consumers. In some embodiments, the system may be further configured to provide scheduling and/or reservation functionalities. For example, available group redemption times may be limited by the capacity of the merchant at a particular time. Additionally and/or alternatively, the system may be configured to schedule a reservation with a merchant after the group redemption time has been determined.

Some embodiments may provide for techniques for determining a group sale threshold for the group promotion. The group sale threshold may indicate a number of purchases of the promotion (and/or agreements to purchase the promotion) that must be exceeded by members of the consumer group before a group discount and/or other incentive may be awarded. Upon the consumer group successfully exceeding the group sale threshold, the system may award the group discount to the consumer group. For example, purchased consumers (and/or purchased consumer accounts of the purchased consumers) of the consumer group that have already purchased the promotion may be provided with a credit and/or refund. In another example, unpurchased consumers (and/or unpurchased consumer accounts of the unpurchased consumers) of the consumer group that has not purchased the promotion may be provided with an opportunity to purchase the promotion at a discounted purchase price. In a third example, the group sale threshold may be based on the number of consumers that has simply agreed to purchase the promotion. Here, when the group sale threshold is exceeded, each consumer that has agreed to purchase the promotion may be charged a discounted purchase price. In that sense, some embodiments may provide for incentives to consumers to share the group promotion such that the group sale threshold can be exceeded. In some embodiments, a consumer may be allowed to set the group sale threshold and larger group sale thresholds may be encouraged via a discounted purchase price that varies based on the user defined group sale threshold.

In some embodiments, the system may be configured to provide an impression of the promotion and/or group promotion to consumer devices, such as for advertising or otherwise communicating the group promotion. An "impression," as used herein, may include a communication, a display, or other perceived indication, such as a flyer, print media, e-mail, text message, application alert, mobile applications, other type of electronic interface or distribution channel and/or the like, of one or more promotions and/or group promotions. In some embodiments, the impression of the group promotion may include an interface or a reference to an interface for discussing, purchasing, accepting and/or redeeming the group promotion.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store consumer information and/or promotion information. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

In some embodiments, server 110 may be configured to receive group promotion data indicating a plurality of consumer accounts that defines a consumer group from a consumer device 106. The group promotion data may further indicate a promotion for which server 110 may be configured to associate with the consumer group.

In some embodiments, server 110 may be configured to provide an incentive to the consumers of the consumer group to purchase the promotion. For example, server 110 may be configured to associate a group discount with each of the plurality of consumer accounts, such as in response to determining that a group sale count for the promotion exceeds a group sale threshold for the promotion. The group sale threshold may indicate a number of consumers of the consumer group that must purchase the promotion, as defined by the group sale count, before the group discount may be applied to one or more consumers of the consumer group. In some embodiments, the group sale discount may be awarded in the form of a credit to consumer accounts and/or a refund, such as for at least a portion of a purchase price for the promotion. In some embodiments, server 110 may be further configured to facilitate promotion sharing between consumers of the consumer group, group redemption planning, event planning, among other things.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions for the promotion to consumer device 102.

FIG. 2 shows a schematic block diagram of example circuitry 200, some or all of which may be included in system 102, server 110, database 112, user device 106, and merchant device 108. In accordance with some example embodiments, circuitry 200 may include various means, such as one or more processors 202, memories 204, communications modules 206, and/or input/output modules 208.

In some embodiments, such as when circuitry 200 is included in system 102, group promotion module 210 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, group promotion module 210 may also or instead be included and configured to perform the functionality discussed herein related providing group promotions. In some embodiments, some or all of the functionality of group promotion module 210 may be performed by processor 202. In this regard, the example processes and algorithms discussed herein can be performed by at least one processor 202 and/or group promotion module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Group Promotions

FIG. 3 shows an example of a method 300 for providing a group promotion to a consumer group, in accordance with some embodiments. Method 300 is described as being performed by system 102 (e.g., server 110), however, other suitable structures (e.g., one or more servers, a networked device, hardware, software, firmware, circuitry, etc.) may also be used in various embodiments.

Method 300 may begin at 302 and proceed to 304, where server 110 may be configured to provide promotions to consumers, such as on an individual basis. For example, server 110 may be configured to receive the promotion data for the promotion, the promotion, and/or an impression of the promotion from merchant device 108. An impression may then be generated based on the promotion data and/or provided to consumer device 106. Upon a consumer purchasing and/or accepting the promotion, the consumer may be provided an instrument that may be used (e.g., with the merchant) toward at least a portion of the purchase of particular goods, services and/or experiences defined by the promotion. An "instrument," as used herein, may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience.

FIG. 7 shows an example of an impression 700, in accordance with some embodiments. Impression 700 is an example of a user interface that includes an indication of one or more promotions that may be provided to consumer devices, such as upon accessing a mobile application and/or a web browser on the consumer devices. While the interface of impression 700 (as well as some of the other displays discussed herein) is adapted for consumer use via a mobile device application (e.g., employing a touchscreen for receiving user inputs), other interfaces adapted for other devices (e.g., tablets, desktops, laptops, etc.) and/or other communication channels (e.g., SMS text. Email, etc.) may be used. As shown in FIG. 7, impression 700 may include a plurality of promotions, such as promotions 702 and 704 (fully viewable upon scrolling down, but not fully shown in FIG. 7).

In addition or alternative to allowing consumers to purchase and/or redeem promotions individually, server 110 may be configured to allow consumers to define group promotions. At 306, server 110 may be configured to receive group promotion data indicating a plurality of consumer accounts and a promotion from a first consumer device associated with a first consumer account. For example, the group promotion data may indicate consumer intent to define a group promotion for a consumer group including the first consumer and one or more other consumers. In another example, the group promotion data received from the first consumer device may indicate only consumers and/or consumer accounts other than the first consumer or a first consumer account of the first user. Server 110 may be further configured to generate the group promotion data to include the first consumer and/or first consumer account within the consumer group.

In some embodiments, server 110 may be configured to receive the group promotion data from consumer device 106 via an application executing on consumer device 106. Additionally and/or alternatively, server 110 may be configured to provide an on-demand group promotion service to consumer device 106 that provides a user interface for submitting the group promotion data to consumer device 106. For example, consumer device 106 may be configured as a thin client that displays graphical outputs generated by server 110 and/or send user inputs received by consumer device 106 (e.g., from a touch screen or other user input device) to server 110 for consumer interaction with the on-demand group promotion service.

FIG. 8 shows an example promotion display 800, in accordance with some embodiments. In some embodiments, promotion display 800 (which may also include an impression indicating the promotion) may be displayed in response to the first consumer selecting the promotion in impression 700, such as by the selection of promotion 702. Promotion display 800 may include some or all of the promotion data in impression 700, and in some embodiments, may include additional details such as price, discount amount, promotion availability, and a more detailed description. The first consumer may be allowed to purchase the promotion, such as on an individual basis, by selecting buy selection 802 (or "buy button 802"). The consumer may also be allowed to create a group promotion using promotion display 800, such as by selecting group promotion selection 804. Here, the primary purchase path in response to buy selection 802 is the purchase of the promotion on an individual basis.

FIGS. 9 and 10 show example add consumer displays 900 and 1000, in accordance with some embodiments. Add consumer displays 900 and 1000 may be provided to the first consumer device to allow the first consumer device to select and/or otherwise specify consumers for addition to the consumer group. For example, the consumer may be allowed to enter the name, phone number, email, and/or other identifying and/or contact information of consumers to be added to the consumer group at consumer entry 902. In some embodiments, as shown add consumer display 1000, server 110 and/or consumer device 106 may be configured to look up consumers associated with the first consumer based on what is entered in consumer entry 902. For example, server 110 may be configured to access consumer data indicating the identity and/or contact information of consumers associated with the first consumer, such as the first consumer's friends or acquaintances (e.g., as may be stored in a social networking system, system 102, and/or consumer device 106 (e.g., user contacts)) to facilitate the entry of the group promotion data. The consumer information may be provided to automatically populate a selectable consumer list, such as consumer list 1002, based on the entry at consumer entry 902.

In some embodiments, the promotion display (e.g., promotion display 800) may provide an electronic message indicating the option to purchase the promotion as a group and receive a reward, incentive, or discount in exchange for the group purchase, such as shown at group promotion selection 804.

FIG. 15 shows an example group promotion creation display 1500, in accordance with some embodiments. Group promotion creation display 1500 is another example of a user interface that may be provided to a consumer device to facilitate the generating and/or sending of the group promotion data to server 110. For example, the first consumer may define the plurality of consumer accounts for the consumer group by providing consumer contact information (e.g., phone number, email address, consumer account username, consumer name, social media account, social networking system account, etc.) of the plurality consumers at consumer search input 1502. In response to receiving the consumer contact information, server 110 may be configured to provide consumer list 1504 including one or more consumers that most closely match the consumer contact information. Via consumer list 1504, the first consumer may be allowed to select one or more consumers for inclusion within the consumer group, which may be indicated at consumer group membership display 1506. In some embodiments, where no matching consumer account is identified (e.g., based on the entry at consumer search input 1502), server 110 may be configured to generate a placeholder account based on the consumer contact information.

In some embodiments, server 110 may be configured to provide recommended consumers for inclusion within the consumer group. For example, group promotion creation display 1500 may include consumer recommendation list 1508 configured to provide one or more recommended consumers for inclusion within the consumer group. In some embodiments, server 110 may be configured to determine the one or more recommended consumers based on promotion relevance. For example, the good, service, and/or experience defined by the group promotion may be compared with consumer data indicating consumer purchases, preferences, interests, among other things. Additionally and/or alternatively, server 110 may be configured to determine the one or more recommended consumers based on a social connection with the first consumer. For example, server 110 may be configured to provide social networking functionality for consumer accounts including "friend" associations between consumers, or the like. Here, server 110 may be configured to determine one or more friends of the first consumer as a recommended consumer. Similarly, the consumers shown in consumer list 1002 may additionally and/or alternatively be determined based on relevance of the promotion to consumers based on purchases, preferences, interests, among other things.

In some embodiments, the group promotion data received from the first consumer device may also include a group redemption time and/or one or more proposed group redemption times. A "group redemption time," as used herein, may indicate a date and/or time of day for which the consumer group will redeem the promotion. For example, the first consumer may be interested in a group event, outing, or activity provided by the promotion, such as a promotion for a discount dinner at a restaurant. In some embodiments, the group redemption time may be provided by the first consumer and shared with other consumers of the consumer. In some embodiments, server 110 may be configured to provide a poll based on receiving group promotion data indicating one or more group redemption times proposed by the first consumer. For example, the poll may be configured to allow consumers of the consumer group to rank the one or more proposed group redemption times provided by the first consumer, and subsequently, to determine a group redemption time that is optimized for the consumer group.

FIG. 11 shows an example group promotion creation display 1100, in accordance with some embodiments. Group promotion creation display 1100 may be provided to the first consumer device, such as in response to the first consumer selecting consumer group completion selection 1004 (e.g., indicating that the first consumer has finished defining membership of the consumer group). Group promotion creation display 1100 may include added consumer display 1102 configured to provide an indication of the consumers in the consumer group and/or allow the first consumer to further modify membership in the consumer group, such as via selection 1104.

Additionally and/or alternatively, group promotion creation display 1100 may include poll selection 1106 to allow the first consumer to select whether to initiate a poll for determining the group redemption time. For example, in response to the first consumer selecting "ON" for poll selection 1106, group promotion creation display 1100 may be configured to provide redemption date listing 1200 (FIG. 12) to allow the first consumer to define the one or more proposed group redemption dates.

FIG. 12 shows an example redemption date listing 1200, in accordance with some embodiments. Redemption date listing 1200 may include a listing of selectable redemption dates. In some embodiments, the first consumer may be allowed to select more than one (e.g., three) proposed redemption dates, such as shown for the Friday, May 17 selection 1202 and Friday, May 24 selection 1204.

In some embodiments, server 110 may be configured to provide scheduling and/or calendar services to consumers. For example, the first consumer may be allowed to view the schedule and/or calendar of other consumers and/or merchants (e.g., open reservations at a restaurant) in connection with selecting the one or more group redemption times, the group purchase threshold, the consumer group members, and/or other group promotion data. For example, as shown in redemption date listing 1200, Saturday, May 18 indicator 1206 may not include a selectable box or the like because reservations with the merchant are unavailable for that date. Additionally and/or alternatively, server 110 may be configured to determine whether the one or more of the proposed group redemption time conflicts with the schedule and/or calendar of the consumers in the consumer group. For example, upon determining a conflict, the first consumer may be notified to take remedial action, such as by specifying a different group redemption time (e.g., conflicting dates may be unselectable and/or otherwise indicated as such), promotion, group purchase threshold, and/or consumer set for the consumer group.

In some embodiments, server 110 may be configured to receive the group promotion data from the first consumer device further indicating a ranking of two or more proposed group redemption times. As shown in FIG. 15, for example, group promotion creation display 1500 may further include proposed group redemption time display 1512 configured to allow the first consumer to select and rank the one or more group redemption times. For example, group redemption time display 1512 indicates that the first consumer has selected and ranked three days in January (e.g., 1, 2 and 3, with 1 being the highest ranked) as three proposed group redemption times.

FIG. 13 shows group promotion creation display 1100 including one or more proposed group redemption times, in accordance with some embodiments. Upon the first consumer selecting the one or more proposed group redemption times (e.g., via redemption date listing 1200), the one or more proposed group redemption times may be shown at 1304 for confirmation by the first consumer. In some embodiments, the first consumer may be further allowed to provide a description, invitation, or other message for the other consumers of the consumer group, such as by entering the message in message entry 1306. Upon the proposed group redemption times, consumer group, group sale threshold, and/or other group promotion data being entered to the first consumer's satisfaction, the first consumer device may be configured to send the group promotion data to server 110, such as in response to the first consumer selecting send selection 1308. Similarly, upon the first consumer completing each of the data entries of group promotion creation display 1500, the first consumer device may be configured to send the promotion data defining the group promotion to server 110, such as in response to the first consumer selecting invite selection 1514. Accordingly, server 110 may be configured to receive the promotion data defining the group promotion from the first consumer device.

FIG. 14 shows an example group promotion confirmation display 1400, in accordance with some embodiments. Server 110 may be configured to provide group promotion confirmation display 1400 to the first consumer device, such as in response to receiving the group promotion data, generating the group promotion, and/or validating the group promotion data. As such, group promotion confirmation display 1400 may include confirmation message 1402 indicating that the group promotion (and/or an associated discussion thereof) has been successfully created. In some embodiments, promotion confirmation display 1400 may further include image entry 1404, which may be configured to receive an image and/or reference to an image of the first consumer that can be subsequently provided to other consumers of the consumer group in connection with the group promotion and/or impression of the group promotion. In some embodiments, the image may be provided by a third party system, such as a third party social networking system.

At 308, server 110 may be configured to create a group promotion by associating the promotion with the plurality of consumer accounts. For example, the promotion and the plurality of consumer accounts may be determined and associated based on the group promotion data received from the first consumer device as discussed above. In some embodiments, associating the promotion with the plurality of consumer accounts may at least partially define the parameters of the group promotion. In some embodiments, server 110 may be further configured to generate and/or determine a group promotion identifier that uniquely identifies the group promotion. Here, the data discussed herein as being associated with a group promotion may be associated with the group promotion via the group promotion identifier. For example, the group promotion identifier may be associated with the promotion via a promotion identifier and the plurality of consumer accounts via consumer account identifiers.

In some embodiments, server 110 may be further configured to generate one or more placeholder consumer accounts based on the group promotion data, such as when the group promotion data indicates a consumer that does not have an existing consumer account. For example, the consumer contact information (and/or other consumer identifying information, such as consumer name) of the group promotion data received from the first consumer device may be compared with consumer account information (e.g., known contact information) of existing consumer accounts. Where a match is found, server 110 may be configured to associate the matching existing consumer account with the promotion. When a match is not found, server 110 may be configured to generate a placeholder consumer account and the placeholder consumer account may be associated with the promotion. Upon the consumer of the placeholder consumer account purchasing the promotion, which may require that the consumer create an actual consumer account, the actual consumer account may be associated with the group promotion. For example, the placeholder consumer account may be converted, upgraded, replaced, or the like with the actual consumer account. A "consumer account," as used herein, may include any type of data that identifies the consumer including placeholder and/or actual consumer accounts.

At 310, server 110 may be configured to determine a group sale threshold for the group promotion. For example, the group sale threshold may indicate a number of purchases of the group promotion and/or agreements to purchase the group promotion that must be exceeded by members of the consumer group before a group discount and/or other incentive may be awarded. For example, a group sale threshold of 4 for the group promotion may indicate that more than four of the consumers of the consumer group must purchase and/or otherwise agree to purchase the group promotion before the group discount and/or other incentive may be awarded to each of the at least four consumers. In some examples, the group sale threshold may be compared with the number of distinct consumers that purchase and/or agree to purchase the group promotion. In another example, the group sale threshold may be based on the number of purchases of and/or agreements to purchase the group promotion across all consumers of the consumer group (e.g., a distinct consumer can purchase the promotion multiple times with each purchase counting toward the group sale count). In some embodiments, the group sale threshold may be different from the number of consumers in the consumer group. For example, for the group sale threshold of 4, a consumer group of ten consumers may be eligible for the group discount so long as at least five consumers purchase and/or agree to purchase the promotion such that the group sale threshold is exceeded.

In some embodiments, the group sale threshold may be determined based on the promotion data of the group promotion that is used as the basis for the group promotion. For example, server 110 may be configured to receive the group sale threshold as promotion data from merchant device 108. Here, merchants may be allowed to specify the group sale threshold at which the merchant may be willing to provide the group discount.

In some embodiments, server 110 may be configured to determine the group sale threshold based on the group promotion data, the promotion data of the promotion, and/or merchant data indicating characteristics of the merchant. For example, the group sale threshold may be smaller for promotions of lower capacity merchants than higher capacity merchants, such as when the merchant is a dine-in restaurant with limited seating. Additionally and/or alternatively, the group sale threshold may be determined based on merchant supply and/or capacity. For example, the group sale threshold may be set based on merchant inventories, merchant availability, consumer demand for a promotion, and/or fluctuations of consumer demand (e.g., within certain times of day, times of week, times of month, times of year, etc.).

Additionally and/or alternatively, the group sale threshold may be based on the group redemption time. For example, the group redemption time may be compared with the merchant data to determine merchant inventories, availability, and/or consumer demand at the group redemption time. Here, the group sale threshold may be set higher based on (e.g., determined, estimated, and/or projected) higher merchant capacity at the group redemption time. For example, a group redemption time of 6 pm for a dine-in restaurant promotion may result in a lower group sale threshold to avoid overcrowding the restaurant during peak hours. Conversely, a group redemption time of 3 pm may result in a higher group sale threshold to entice consumers to the restaurant during non-peak hours. In another example, the group sale threshold may be set lower for group redemption times during non-peak hours and/or when consumer demand is otherwise low to entice consumers to purchase the group promotion (e.g., to receive the group discount).

In some embodiments, the group sale threshold may be defined by a consumer, such as the first consumer that creates the group promotion by providing the group promotion data. In that sense, server 110 may be further configured (e.g., at 306) to receive the group promotion data from the first consumer device indicating the group sale threshold and to determine the group sale threshold based on the group promotion data received from the first consumer device. As shown in FIG. 15, for example, group promotion creation display 1500 may further include group sale threshold entry 1510. Via group sale threshold entry 1510, for example, the first consumer may be allowed to specify the group sale threshold, such as the group sale threshold of four consumers shown at group sale threshold entry 1510. In some embodiments, the first consumer may be incentivized to define a larger group sale threshold by providing greater incentives for larger group sale thresholds. In some embodiments, the group promotion may be associated with a plurality of group sale thresholds, with each higher group sale threshold being associated with a larger incentive.

At 312, server 110 may be configured to provide an impression of the group promotion to a second consumer device associated with a second consumer account of the plurality of consumer accounts. In some embodiments, server 110 may be configured to provide the impression to each consumer of the consumer group, such as via consumer devices associated with each of consumer. The impression may include a message indicating the availability of the group promotion for acceptance and/or purchase by the second consumer as a group promotion and/or user interfaces for taking further action. In some embodiments, the impression and/or other user interface may include a group discussion interface for discussing the group promotion among members of the consumer group. Additionally and/or alternatively, in some embodiments, the impression and/or other user interface may include a polling interface for receiving redemption time data from consumer devices of the consumer group indicating availability of the other consumer for the one or more proposed group redemption times.

In some embodiments, server 110 may be configured to send a message indicating the group promotion to a consumer device 108 based on the group promotion data provided by the first consumer device. For example, if the first consumer device provided a consumer account username and/or other consumer identifying data (e.g., name, email, telephone number, etc.) associated with a valid consumer account, server 110 may be configured to push a message to the second consumer device associated with the second consumer account.

FIG. 16 shows an example consumer application home display 1600, in accordance with some embodiments. For example, in response to the second consumer accessing a consumer device application and/or a webpage, among other things, provided by server 110, server 110 may be configured to provide consumer application home display 1600 to the second consumer device. Consumer application home display 1600 may include an impression of one or more promotions, such as the "Featured" promotions 702 and 704. Furthermore, consumer application home display 1600 may include group discussion selection 1602. Group discussion selection 1602 may include unread message indicator 1604 to provide a count of the unread messages from other consumers (e.g., of the consumer group for the group promotion and/or other group promotions) and/or other group promotion status/discussion updates regarding group promotions. In response to the consumer selecting group discussion selection 1602, the consumer may be provided with a listing of group promotions to which the consumer is a member.

FIG. 17 shows an example group promotion membership display 1700, in accordance with some embodiments. Group promotion membership display 1700 may be an example of a user interface provided to the second consumer device, such as in response to the second consumer selecting group discussion selection 1602 in consumer application home display 1600. Group promotion listing 1700 may include a display of selectable group promotions to which the second consumer is a member, such as group promotion 1704.

FIG. 25 shows an example notification display 2500, in accordance with some embodiments. Notification display 2500 may be an example of a user interface provided to the second consumer device, such as in response to the second consumer selecting group discussion selection 1602 in consumer application home display 1600. Notification display 2500 may include a display of selectable group promotions to which the second consumer is a member, such as group promotion 2502. In some embodiments, notification display 2500 may include other types of notifications. For example, notification display 2500 may include social network notifications such as friend/follow request 2504, friend status update 2506, gift-related update and/or message 2508, merchant activity update 2510, rewards tracking update 2512 (e.g., for the consumer and/or another consumer), and/or promotion status update 2506. For example, promotion status update 2506 may indicate that a promotion purchased by the consumer has an upcoming redemption date deadline. The group promotion status/discussion updates may be integrated with other types of notifications to provide consumers with a single, convenient interface for various interactions, discussions, and notifications.

FIG. 18 shows an example group discussion interface (e.g., a "group promotion event interface") 1800, in accordance with some embodiments. Server 110 may be configured to provide group discussion interface 1800 to consumer devices, such as in response to a consumer selecting a group promotion in group promotion listing 1700 and/or notification display 2500, among other things. A group promotion event interface may provide for increased interoperability between different types of consumer devices. For example, different types of consumer devices and/or access channels (e.g., mobile application, web browser application, etc.) may generate consumer inputs that can be shared within the group discussion interface. Furthermore, the group promotion event interface may provide for increased efficiency in terms of consumer device inputs required for functionality such as group planning, redemption time polling, among other things. Group discussion interface 1800 may include a texting, messaging and/or chat room type interface for receiving consumer discussion messages. For example, a consumer may provide a message at message input 1802, which may be provided (e.g., in a chronological order) to other consumers of the consumer group for the group promotion via message feed 1804. Here, consumers may plan, organize, debate, or otherwise discuss the group promotion and/or any other topic related to the group promotion (e.g., group redemption times and/or consumer availability, among other things).

In some embodiments, changes in the status of the group promotion may be provided to group discussion interface 1800. For example, message feed 1806 may include news items or other updates, such as purchase message 1806 indicating that a consumer has purchased the promotion. Other example items that may be displayed on message feed 1806 and/or group discussion interface 1800 may include updates indicating that a consumer has agreed to purchase the group promotion, the (e.g., updated) group sale count and/or the group sale threshold, the progress to meeting the group sale threshold (e.g., as shown at 1808), the group redemption time, proposed redemption times, proposed redemption time polling results, and/or among other things.

In some embodiments, the (e.g., second) consumer device may be configured to allow the user to specify notification settings for a particular group promotion/discussion and/or for group promotions/discussions in general. For example, in response to selecting settings button 1812 in group discussion interface 1800, the consumer device may be configured to provide an interface for allowing the consumer to leave a group promotion/discussion, mute a group promotion/discussion (e.g., turn off group discussion status change notifications, pop-ups and/or other indicators), among other things.

FIG. 26 shows an example group discussion interface (e.g., a "group promotion event interface") 2600, in accordance with some embodiments. Some or all of the description above with respect to group discussion interface 1800 may be applicable to group discussion interface 2600. For example, changes in the status of the group promotion may be provided to group discussion interface 2600. For example, message feed 2602 may include news items, discussions, and/or other updates.

In the depicted embodiment, message feed 2602 comprises a group purchase message 2604 that includes a promotion description 2604*a*, a group sale threshold 2604*b* (e.g., take additional 15% off if 3 of your friend buy), and a group sale count 2604*c* (e.g., only one of the three needed friends have purchased). The depicted group sale count 2404*c* embodies a graphical display. For example, each user or friend that has accepted and/or purchased the group promotion may be represented by a different icon/image (e.g., the dark icon) than each user that has not yet accepted and/or purchased the group promotion (e.g., the light grey icons).

Group discussion interface 2600 may include a message input 2606. The discussion above regarding message input 1802 of group discussion interface 1800 may be applicable to message input 2606. In some embodiments, in response to the consumer selecting expanded message input button 2608, the consumer may be allowed to provide various (e.g., non-text) data via the expanded message input display shown in FIG. 27 to group discussion interface 2600. The content provided by the consumer via message input 2606 may be displayed for other group members within message feed 2602.

FIG. 27 shows an example expanded message input display 2700 (e.g., as initiated by the expanded message input button 2608 of FIG. 26), in accordance with some embodiments. Expanded message input display 2700 may provide an interface that allows the user to accept/purchase the group promotion (e.g., via selection of buy promotion button 2702) and/or add content (e.g., video, images, music, etc.) to the group promotion discussion. Here, expanded message input display 2700 may be provided as a separate display from group discussion interface 2600 and/or may be provided within group discussion interface 2600 (e.g., in place of message input 2606).

Expanded message input display 2700 may include add video button 2604 and/or add image buttons 2706 and/or 2708. In response to selecting these buttons, the consumer may be prompted to provide a file (e.g., stored in the consumer device memory) and/or a reference to a file (e.g., stored in the consumer device memory or remotely) for inclusion within the message. The consumer may further enter text within text input 2710. Subsequent to entering the desired data, the content provided by the consumer may be sent to the central system in response to the consumer selecting send button 2712. In some embodiments, the central system may be configured to provide the submitted content to a group discussion interface. The content may be included as references and/or may be embedded within the message feed. In some embodiments, other types of data and/or user-provided content may also be included within a message and shared with other consumers within group discussion interface 1800 and/or 2600.

In some embodiments, server 110 may be configured to send the impression directly using consumer contact data (e.g., email, telephone number, etc.) provided by the first consumer, such as by using a suitable communication channel for the consumer contact data. In some embodiments, server 110 may be configured to determine that the consumer contact data is not associated with a known consumer account, and in response, may be configured to provide the impression using the consumer contact data. In that sense, consumers that do not have consumer accounts may be added to a consumer group for a group promotion. Additionally and/or alternatively, such consumers may be further incentivized by the group promotion and/or group discount to create a consumer account. For example, server 110 may be configured to require unregistered consumers to create a consumer account before participating in the group promotion (e.g., participating in a discussion, poll, group promotion purchase, and/or agreement to purchase the group promotion).

In some embodiments, server 110 may be configured to use any other suitable communication channel for sharing the group promotion, such as email, instant message, social networking system, the on-demand group promotion service, a user interface provided by server 110, or the like. For example, where email is used, server 110 may be configured to receive the group promotion data in the form of email addresses. In some embodiments, the group promotion data received from the first consumer to define the consumer group may include one or more different forms of consumer contact information and server 110 may be further configured to provide the impression of the promotion to the consumer group using one or more different communication channels as suitable for the consumer contact information (e.g., email channel for an email address, SMS text for a telephone number, etc.).

FIG. 19 shows an example of a text message 1900, in accordance with some embodiments. In some embodiments, server 110 may be configured to send an SMS text message and/or other text message notification to the second consumer device using a telephone number (e.g., as provided by the first consumer). For example, text message 1900 may include message 1902 (e.g., the message provided by the first consumer in message entry 1306 shown in FIG. 13) and reference 1904 (e.g., a hyperlink) to an impression of the group promotion FIG. 20 shows an example impression 2000, in accordance with some embodiments. Impression 2000 may be accessed by selecting reference 1904 in text message 1900, which in some embodiments, may cause the second consumer device to launch a web browser and/or consumer application to access impression 2000. Impression 2000 may include promotion 2002 indicating promotion data about the promotion. The second consumer may be allowed to take further action, such as by logging in and/or creating a consumer account using sign in/up selection 2004. In some embodiments, the consumer may be allowed to access a consumer account via a third party account provided by a third party system (e.g., a social networking system). For example, in response to the second consumer selecting third party account login 2006, the second consumer may be allowed to access a consumer account or a placeholder consumer account using third party login data.

FIG. 21 shows an example group discussion interface (e.g., a "group promotion event interface") 2100, in accordance with some embodiments. The discussion above regarding group discussion interface 1800 may be applicable to group discussion interface 2100. However, group discussion interface 2100 is shown as being accessed by a web browser whereas group discussion interface 1800 is shown as being accessed by a consumer application. In general, any suitable interface and/or communication channels for providing a group discussion may be used. For example, the group discussion interface may be part of a social networking system wall, newsfeed, timeline, or the like. In another example, consumers may be allowed to discuss group promotions directly using SMS text messages. In some embodiments, various consumers can use different communications channels. Server 110 may be configured to aggregate communications from each channel and/or provide the communications to the consumer group using different channels as may be suitable for different consumers.

FIG. 22 shows an example impression 2200, in accordance with some embodiments. Impression 2200 illustrates some of the other group promotion data that may be included in an impression. For example, impression 2200 may include promotion 2202, promotion description 2204, group sale threshold 2206, group discount 2208 (e.g., as discussed in further detail below in connection with FIG. 4), consumer group membership 2210, group sale count 2212 (e.g., as discussed in further detail below in connection with FIG. 4). In some embodiments, impression 2200 may further include the group redemption time, one or more proposed group redemption times, a group redemption time poll, group redemption time poll results and/or other data related to the discussion, purchase, and/or redemption of the group promotion.

In some embodiments, server 110 may be further configured to provide the impression via a social networking system (e.g., provided by system 102 and/or a third party system). With reference to group promotion creation display 1100 shown in FIG. 11, for example, the first consumer may select social networking system share selection 1110. In response to the first consumer selecting "ON" for social networking system share selection 1110, server 110 may be configured to post the impression and/or a reference to the impression to first consumer's social networking feed, newsfeed, timeline, profile page, and/or among other things. Returning to FIG. 3, Method 300 may then end at 314.

FIG. 4 shows an example of a method 400 for providing a group discount of a group promotion, in accordance with some embodiments. Method 400 is described as being performed by system 102 (e.g., server 110), however, other suitable structures (e.g., one or more servers, a networked device, hardware, software, firmware, circuitry, etc.) may also be used in various embodiments. In some embodiments, method 400 may be performed after method 300, such as after the impression of the promotion is sent to one or more consumer devices (e.g., the second consumer device as discussed in method 300) associated with the consumer accounts defined by the consumer group.

Method 400 may begin at 402 and proceed to 404, where server 110 may be configured to determine a group sale count indicating a number of the consumers of the consumer group that has purchased and/or agreed to purchase the group promotion. For example, the group sale count may begin at 1 (e.g., for the first consumer if the first consumer has purchased the group promotion and/or agreed to purchase the group promotion) and may be incremented each time a unique consumer of the consumer group purchases and/or agrees to purchase the group promotion. In that sense, server 110 may be configured to track purchases of the group promotion by members of the consumer group.

In some embodiments, only consumers that actually purchase the group promotion may contribute to the group sale count. In other embodiments, consumers that agree to purchase the group promotion (e.g., but are not yet charged) may additionally and/or alternatively contribute to the group sale count. In general, the type of consumer activity that contributes to the group sale count may be based on the type of activity specified for exceeding the group sale threshold.

In some embodiments, server 110 may be configured to provide a user interface to consumer devices for purchase and/or acceptance of the group promotion. For example, the impression, message, and/or notification indicating the group promotion sent to the second consumer device at 312 of method 300 may include the user interface and/or a reference to the user interface. As shown in FIGS. 18 and 21, group discussion interfaces 1800 and 2100 may respectively include buy selection 1810 and buy selection 2102. In another example shown in FIG. 22, impression 2200 may include buy selection 2214.

In some embodiments, server 110 may be further configured to determine a purchase price for the promotion. The purchase price, for example, may be determined based on the promotion data of the promotion, such as promotion data received from merchant device 108. In some embodiments, the purchase price may represent a discount defined by the promotion when the promotion is purchased on an individual basis, such as a discount from the regular price (e.g., the retail, standard, and/or otherwise non-discounted price) of a good, service and/or experience defined by the promotion. Server 110 may be further configured to provide the group promotion for the purchase price and determine the group sale count indicating the number of the consumers (e.g., of the consumer group) that has purchased the group promotion for the purchase price.

At 406, server 110 may be configured to determine whether the group sale count exceeds the group sale threshold for the group promotion. For example, the group sale threshold may be determined as discussed at 310 of method 300. Also discussed above, the group sale count may be incremented each time the group promotion is purchased by a consumer of the group consumer and/or a unique consumer of the group consumer. Furthermore, server 110 may be configured to monitor group promotions and their group sale counts to take appropriate action upon the group sale count of a group promotion exceeding the group sale threshold, such as by providing a status update for the group promotion via a discussion interface and/or other message to consumers.

In some embodiments, the user interface for purchase and/or acceptance of the group promotion may indicate a progress of the group sale count relative to the group sale threshold. For example, a message may include "you are the final purchaser required for the entire group to get a discount," indicating that the group sale count is one purchase away from the group sale threshold. The indication of progress and/or message may be provided within a group promotion landing webpage, an impression of the promotion, a shopping cart interface and/or a checkout interface. In that sense, a consumer may be tempted to purchase a group promotion to help other group members receive the group discount.

In some embodiments, consumers may be provided with a limited time period in which to purchase and/or agree to purchase the group promotion. Here, the determination at 406 may be performed upon lapse of the limited time period.

In response to determining that that the group sale count fails to exceed the group sale threshold, method 400 may return to 404, where server 110 may be configured to continue monitoring the purchases of and/or agreements to purchase the promotion by consumers of the consumer and increment the group sale count when appropriate.

In response to determining that that the group sale count exceeds the group sale threshold, method 400 may proceed to 408, where server 110 may be configured to associate a group discount with each of the plurality of consumer accounts. The group discount may represent an additional discount to incentivize consumers to purchase the promotion as a group. In that sense, the group discount may be applied to the purchase price for the promotion, which as discussed above, may itself represent a discount from the regular price of the good, service and/or experience defined by the promotion.

In some embodiments, server 110 may be configured to provide a group sale threshold satisfaction notification. For example, the notification may be provided to a group promotion event interface and/or a message feed.

In some embodiments, server 110 may be configured to determine the group iscount value may be received as promotion data, such as from merchant device 108 of a merchant providing the promotion defined by the promotion data. In some embodiments, server 110 may be configured to determine the group discount and/or group discount value based on the group promotion data received from a consumer device (e.g., at 306 of method 300) and/or generated by server 110. For example, the group discount may be determined based on the group sale count and/or group sale threshold. For example, a larger group discount may be determined for larger group sale counts and/or group sale thresholds to encourage more consumers to purchase the group promotion. Additionally and/or alternatively, different consumers and/or their consumer accounts may be associated with different group discounts. For example, the first consumer that creates the group promotion may be awarded with a larger group discount than other consumers who only purchase and/or accept the promotion. In another example, the group discount may depend on the purchase order of the consumer or the timing of the purchase. For example, earlier purchasers may be associated with a larger group discount to encourage early purchase, discussion, polling, among other things.

At 410, server 110 may be configure to determine at least one purchased consumer account of the plurality of consumer accounts of a consumer that has purchased the group promotion. For example, each consumer of the consumer group that has purchased the group promotion may be determined to be associated with a purchased consumer account.

At 412, server 110 may be configured to provide the group discount as a credit and/or refund for at least a portion of a purchase price for the promotion to the at least one purchased consumer account. For example, the consumer may have purchased the group promotion for the (e.g., non-group-discounted) purchase price of the promotion prior to the group sale count exceeding the group sale threshold. Here, one or more of the purchasing consumers may be awarded at least a portion of the purchase price of the underlying promotion, as defined by the group discount.

In some embodiments, the group discount or some portion thereof may be provided as a credit to a consumer account. For example, after awarding the credit to the consumer account, server 118 may be configured to accept the credit toward at least a portion of a future promotion and/or group promotion purchase. Alternatively and/or additionally, the group discount or some portion thereof may be provided as a refund, such as a monetary value for at least a portion of the purchase price of the underlying promotion, as defined by the group discount. In some embodiments, the group discount or some portion thereof may be provided in the form of a reward, prize, a second promotion, and/or other incentive value.

At 414, server 110 may be configured to determine at least one unpurchased consumer account of the plurality of consumer accounts of a consumer that has failed to purchase the group promotion. For example, a consumer may be determined to be associated with an unpurchased consumer account after failing to purchase the group promotion, such as by merely agreeing to purchase the group promotion and/or by otherwise not purchasing the group promotion.

At 416, server 110 may be configured to provide the group discount as a discounted purchase price for the group promotion to the at least one unpurchased consumer account. For example, in some embodiments, server 110 may be configured to associate the group discount with each of the plurality of consumer accounts of the consumer group at 408, including those consumer accounts that have yet to purchase the group promotion and/or agree to purchase the group promotion when the group sale count exceeded the group sale threshold (e.g., as determined at 408). Here, rather than providing a credit, refund, or the like after charging the purchase price of the underlying promotion, the unpurchased consumers may be allowed to purchase the group promotion for the discounted purchase price because the consumer group has successfully exceeded the group sale threshold.

In some embodiments, such as when the group sale count and group sale threshold are based on consumers that agree to purchase the group promotion, and when the group sale threshold is exceeded by the group sale count, each consumer that agreed to purchase the group promotion may be automatically charged (e.g., via a credit card account or other financial account) the discounted purchase price of the group promotion. Method 400 may then end at 412.

FIG. 5 shows an example of a method 500 for determining a group redemption time based on a poll, in accordance with some embodiments. Method 500 is described as being performed by system 102 (e.g., server 110), however, other suitable structures (e.g., one or more servers, a networked device, hardware, software, firmware, circuitry, etc.) may also be used in various embodiments.

Method 500 may begin at 502 and proceed to 504, where server 110 may be configured to provide an impression of a group promotion to a second consumer device associated with a second consumer account of the plurality of consumer accounts, the impression including a user interface for discussing the group promotion and one or more proposed group redemption times. The discussion at 306 of method 300 may be applicable at 504. For example, server 110 may be configured to receive the one or more proposed redemption times from the first consumer device as a portion of the group promotion data. Additionally and/or alternatively, the impression including the one or more proposed redemption times may be provided in response to the first consumer initiating a poll, such as by selecting poll selection 1106 in group promotion creation display 1100. In some embodiments, the discussion at 312 of method 300 may also be applicable at 504.

FIG. 23 shows an example group discussion interface (e.g., a "group promotion event interface") 2300, in accordance with some embodiments. The discussion above regarding group discussion interfaces 1800 and/or 2100 may be applicable to group discussion interface 2300. For example, group discussion interface 2300 may be provided to consumer devices associated with consumers of the consumer group. Group discussion interface 2300 may further include group redemption time poll selection 2302, configured to allow the consumers to vote on the one or more proposed redemption times provided by the first consumer (e.g., at 306 of method 300).

In some embodiments, server 110 may be configured to facilitate planning of a group event or activity. For example, one or more consumers of the consumer group (e.g., the first consumer) may be determined to be a group administrator or leader. The first consumer that defines the group promotion may be given administrator status by default and/or may be allowed to designate other consumers as administrators. The group administrator(s) may be allowed to add consumers to the consumer group, remove consumers from the consumer group, cancel the group promotion, update the group redemption time and/or a proposed group redemption time, change the group sale threshold, among other things.

At 506, server 110 may be configured to receive redemption time data from the second consumer device indicating availability of the second consumer for the one or more proposed group redemption times. FIG. 24 shows an example polling interface 2400, in accordance with some embodiments. Polling interface 2400 may be provided to a consumer device in response to a consumer selecting group redemption time poll selection 2302 in group discussion interface 2300. Via polling interface 2400, the second consumer may be allowed to generate the redemption time data indicating which of the one or more proposed group redemption times are available for the second consumer. For example, polling interface 2400 shows that Friday, May 17 selection 2402 has been selected to indicate availability and Friday, May 24 selection 2404 has been unselected to indicate unavailability. In some embodiments, the second user may also be allowed to rank the one or more proposed group redemption times, which may also be provided to server 110 as part of the redemption time data. In response to the second consumer selecting send redemption data selection, the second consumer device may be configured to send the redemption data to server 110.

At 508, server 110 may be configured to determine the group redemption time for the group promotion based at least in part on the redemption time data. For example, server 110 may be configured to determine the group redemption time as a time that best fits the consumer group as determined by the redemption time data received from the consumers of the consumer group.

In some embodiments, such as when the consumers have ranked the one or more proposed redemption times, server 110 may be configured to programmatically determine the proposed redemption time by generating a group redemption time score for each proposed group redemption time based on the rankings. For example, in a consumer group of four consumers and for four proposed group redemption times, the redemption time data may indicate the following:
Consumer 1 (organizer):
1: Jan 24, 7:30
2: Jan 24, 8:30
3: Jan 26, 2:15
4: Jan: 26, 8:30
Consumer 2:
1: Jan 24, 7:30
2: Jan 26, 8:30
3: Jan 26, 2:15
4: Jan 24, 8:30
Consumer 3:
1: Jan 26, 2:15
2: Jan 24, 8:30
3: Jan 26, 8:30
Cannot attend: Jan 24, 7:30
Consumer 4:
1: Jan 24, 8:30
2: Jan 26, 8.30
Cannot attend: Jan 24, 7:30, Jan 26, 2:15

Here, for example, the consumer 1 (e.g., the first consumer) has indicated that the January 24, 7:30 redemption time is the most preferred redemption time for the first consumer (e.g., rank=1), the January 24, 8:30 redemption time as the second most preferred redemption time (e.g., rank=1), the January 26, 2:15 redemption time as the third most preferred redemption time (e.g., rank=3), and so forth. Consumer 4 (e.g., a second consumer) has indicated that the January 24, 7:30 and January 26, 2:16 redemption times are unavailable. Here, the rank may be determined as 1+(the number of total proposed redemption times). For example, because there are 4 total proposed redemption times, the rank for an unavailable indication may be determined as 5.

In some embodiments, the group redemption time score S for each proposed group redemption time T may be given by Equation 1:

$$S(T) = \sum_{n=1}^{M} \text{rank}(T, n)/M,$$

where rank(T, n) is the rank for the nth consumer of the consumer group for proposed redemption time T, and M is the total number of consumers (e.g., that have provided redemption time data) of the consumer group.

Applying Equation 1 to the example redemption time data above, for example, the group redemption scores for each group may be determined as:
S(Jan 24, 7:30)=(1+1+5+5)/4=3
S(Jan 24, 8:30)=(2+4+2+5)/4=3.25
S(Jan 26, 2:15)=(3+3+1+5)/4=3
S(Jan 26, 8:30)=(4+2+3+2)/4=2.75

Here, the January 26, 8:30 group redemption time may be determined as the group redemption time because it includes the best (e.g., lowest valued) group redemption time score S(T).

In some embodiments, server 110 may be configured to determine the group redemption time by optimizing for maximum number of available consumers and then the best group redemption time score. For example, the group redemption time scores and availability may be determined from the redemption time data discussed above as:
S(Jan 24, 7:30)=(1+1+5+5)/4=3; 2 of 4 consumers available
S(Jan 24, 8:30)=(2+4+2+5)/4=3.25; all 4 consumers available
S(Jan 26, 2:15)=(3+3+1+5)/4=3; 3 of 4 consumers available S(Jan 26, 8:30)=(4+2+3+2)/4=2.75; all 4 consumers available Here, the January 24, 8:30 and January 26, 8:30 proposed group redemption times may be first selected as viable candidates because they include the maximum number of available consumers. Next, the best group redemption time score among the selected proposed group redemption times may be determined as the group redemption time. For example, the January 26, 8:30 proposed group redemption time (S=2.75) may be selected over the January 24, 8:30 group redemption time (S=3.25) based on the group redemption time scores.

In some embodiments, where the analysis above results in a tie between two or more proposed group redemption times, server 110 may be configured to select the group redemption time based on the highest-ranking time for the first consumer (e.g., the organizer) among the two or more proposed group redemptions.

In some embodiments, if a determined group redemption time is unavailable for the merchant (e.g., no reservations available), then one or more proposed redemption times list may be traversed (e.g., in ranked order) until the highest ranking group redemption time (e.g., that exceeds the group sale threshold) may be selected as the group redemption time. In that sense, server 110 may be further configured to communicate with a merchant device and/or merchant system (e.g., merchant device 108) to determine available reservation times for the merchant.

At 510, server 110 may be configured to provide the group redemption time to the second consumer device. For example, the determined group redemption time may be provided to consumer devices associated with each consumer of the consumer group. In some embodiments, the group redemption time may be provided via a group discussion interface (e.g., group discussion interfaces 1800, 2100, and/or 2300), such as within a message feed 1806 shown in FIG. 18.

At 512, server 110 may be configured to provide the group redemption time to a merchant device for reservation. For example, the group redemption time may be provided to merchant device 108 via network 104 shown in FIG. 1. Merchant device 108 may be further configured to schedule a reservation for the consumer group at the group redemption time. In some embodiments, server 110 may be configured to provide any additional information suitable in creating the reservation. For example, server 110 may provide the number of consumers that will attend, various consumer preferences, special accommodations, and/or among other things.

In some embodiments, a group discussion interface may be locked (e.g., from future updates and/or messages), removed from a user's listing and/or notifications, moved to the bottom of the listing and/or notifications, otherwise displayed less prominently, and/or otherwise set to a completed status subsequent to lapse of the group redemption time. Alternatively, the group discussion interface may be configured to persist (e.g., fully or for only limited types of consumer interactions) subsequent to lapse of the group redemption time. For example, the group discussion interface may be configured to allow group discussion for a predetermined time following the group redemption time or group redemption event (e.g., after the group participated in the purchased promotion), upon lapse of a predetermined time without a message feed update, upon receiving an instruction from a consumer device and/or merchant device, and/or combinations thereof. In embodiments where a group discussion interface may persist subsequent to redemption, consumers may be allowed to use the group discussion interface for post-promotion discussion, promotion reviews, like indications, surveys and/or ratings, among other things. Method 500 may then proceed to 514 and end.

FIG. 6 shows an example of a method 600 for providing a group promotion to a consumer group based on a group promotion identifier, in accordance with some embodiments. For example, a group promotion may be associated with a group promotion identifier and the group promotion identifier may be used to exchange group promotion related information between networked consumer devices. The group promotion identifier provides a technical solution to the efficient association of data received from consumer devices, which is particularly advantageous when the system is connected with numerous consumer devices and processing group promotion data for numerous consumer groups in parallel. Method 600 is described as being performed by system 102 (e.g., server 110), however, other suitable structures (e.g., one or more servers, a networked device, hardware, software, firmware, circuitry, etc.) may also be used in various embodiments.

Method 600 may being at 602 and proceed to 604, where server 110 may be configured to receive group promotion data indicating a group promotion from the first consumer device associated with the first consumer device. The discussion at 306 of method 300 may be applicable at 604. The group promotion data may, but does not necessarily, indicate other consumers to be included within the consumer group. Server 110 may be further configured to associate the promotion with the first consumer account of the first consumer such that the first consumer is added to the consumer group.

At 606, server 110 may be configured to determine a group sale threshold for the group promotion. The discussion at 310 of method 300 may be applicable at 606, and is not repeated to avoid unnecessarily overcomplicating the disclosure. Furthermore, the group sale threshold may indicate a number of purchases of the promotion that must be exceeded by consumers that provide the group promotion identifier (discussed in further detail below) in connection with a purchase of the promotion before a group discount and/or other incentive may be awarded At 608, server 110 may be configured to determine a group promotion identifier for the group promotion. The group promotion identifier may include a token, code, key, and/or other data that uniquely identifies the group promotion. In some embodiments, the group promotion identifier may at least partially include random or pseudorandom code, such as may be generated by server 110. Furthermore, in some embodiments, the promotion (e.g., as defined by promotion data) and other data discussed herein associated with the promotion (e.g., the group promotion data) may be associated via the group promotion identifier.

At 610, server 110 may be configured to provide the group promotion identifier to consumers. In some embodiments, server 110 may provide the group promotion identifier to the first consumer device. The first consumer device may then be configured to share the group promotion identifier with other consumer devices associated with other consumers. For example, the group promotion identifier may be associated with an impression sent from the first consumer device to a second consumer device.

In some embodiments, the group promotion identifier may be provided via an email message, such as by being included within the message and/or via a reference within the email message. The consumer may share the group identifier at any time by accessing the email message. In that sense, the number and selection of consumers that are offered a group promotion is not necessarily predefined (e.g., at the creation of the group promotion).

The group promotion and/or group promotion identifier that may be shared by a consumer using any suitable communication channel including email, text, mobile application, webpage, online social networking, among other things. In some embodiments, server 110 may be configured to provide an interface that facilitates sharing via one or more communication channels. For example, in response to the consumer selecting social network share button 1310 in group promotion creation display 1100 of FIG. 13, server 110 may be configured to provide an impression of the group promotion to a profile, newsfeed, board, timeline, etc. of an online social network.

In some embodiments, server 110 may be configured to provide the group promotion identifier to a second consumer device associated with a second consumer, such as in connection with the impression of the promotion as discussed at 312 of method 300. Here, the group promotion data received at 604 may indicate one or more other consumers including the second consumer and/or consumer contact information for the one or more other consumers. In some embodiments, the consumer that created the group promotion, and/or a consumer that later joins the group promotion, may be allowed to specify consumers that are to receive the group promotion identifier and/or otherwise access the group promotion.

At 612, server 110 may be configured to receive the group promotion identifier in connection with a purchase (and/or acceptance) of the group promotion from a second consumer device associated with a second consumer account and/or second consumer. For example, server 110 may be configured to provide a user interface for purchase of the group promotion that is further configured to receive the group promotion identifier. Where a valid group promotion identifier is not received, the purchase of the promotion may be treated as a regular purchase separate from a group promotion. In some embodiments, receiving group promotion identifier may include server 110 being configured to receive an indication from the second consumer device that the second consumer is interested is joining the group promotion identified by the group promotion identifier. In another example, such as where the consumer group is predefined, server 110 may be configured to authenticate the consumer and/or otherwise confirm consumer membership to the consumer group based on the group promotion identifier.

At 614, server 110 may be configured to associate the group promotion with the second consumer account. For example, the second consumer may be added to the consumer group. In some embodiments, the group promotion identifier may be received in connection with consumer account creation instead of, or in addition to, purchase of the promotion, such as when the second consumer is a new user. Here, server 110 may be configured to associate the promotion with the second consumer account after consumer account creation, such that the second consumer may be added to the consumer group even when the second consumer has not purchased or has not yet purchased the group promotion.

At 616, server 110 may be configured to increment the group sale count after the second consumer account and/or second consumer has purchased (and/or agreed to purchase) the group promotion. The discussion at 404 of method 400 may be applicable at 616, and is not repeated to avoid unnecessarily overcomplicating the disclosure.

In some embodiments, server 110 may be configured to determine a maximum consumer amount defining a maximum number of consumers that may be allowed to join a group promotion. For example, where the first consumer that creates the promotion is allowed to share the group promotion identifier and/or otherwise advertise the group promotion, the maximum consumer amount for a group promotion may better allow merchants to control customer flow and to prevent commercial misuse. In some embodiments, a maximum consumer amount may define a total number of consumers that may join a group promotion associated with a particular promotion. For example, regardless of how the total number of consumers is grouped with each other, server 110 may be configured to place a cap on the number of group promotions and associated group discounts available.

In some embodiments, consumers that purchase a group promotion may be tracked and compared with the maximum consumer amount. When the maximum consumer amount has been exhausted by consumer purchases, the group promotion may become unavailable. In some embodiments, server 110 may be configured to reserve one or more instances of a promotion for non-group buying use. Here, when the maximum consumer amount for a promotion is exhausted, references to group buying and the interfaces discussed herein related to group buying may be omitted and/or removed from impressions indicating the promotion. Method 600 may then end at 618.

FIG. 28 shows an example of a method 2800 for providing a group promotion as part of a primary purchase path of a consumer device user interface, in accordance with some embodiments. Method 2800 may advantageously provide for robust consumer grouping via networked consumer device interactions, such as without requiring predefinition of group membership (e.g., via the use of an electronic reference and/or group promotion identifier) and/or other additional group promotion-related consumer device inputs during purchase of the promotion (e.g., via a primary purchase path as discussed in greater detail below). Advantageously, consumers without preexisting consumer accounts with the system can be subsequently added to the consumer group (e.g., with or without a registration or consumer account creation).

Method 2800 may begin at 2802 and proceed to 2804, where server 101 may be configured to provide, via a network (e.g., network 104), a consumer interface including a promotion display with an interactive buy button to the consumer device. FIG. 29 shows an example of a promotion display 2900 in accordance with some embodiments. The discussion above regarding promotion displays, such as promotion display 800 shown in FIG. 8 may be applicable at 2804 and to promotion display 2900.

Buy selection 2904 may be prominently displayed to indicate the primary purchase path within the user interface of the consumer device. For example, the increased font size and green on black contrast with the surrounding background for buy button 2904, as well as its placement within promotion display 2900 with promotion information 2902 is designed to clearly indicate to the consumer that buy button 2904 can be used to purchase the promotion.

Rather than providing a link to purchase the promotion on an individual basis as discussed above, however, server 110 may be configured such that consumer selection of buy button 2904 initiates a primary purchase path resulting in creation of a group promotion in addition (or alternative) to the purchase of the promotion on an individual basis (e.g., as discussed above in response to the consumer selecting buy button 802 within promotion display 800). Because creation of the group promotion is now tied to the primary purchase path and buy button 2904, non-primary purchase path selections such as group promotion selection 804 (e.g., used to initiate a purchase of the promotion as a group promotion) in promotion display 800 may be omitted from promotion display 2900. In some embodiments, buy selection 2902 may be more prominently displayed than one or more alternative purchase paths (e.g., purchase on an individual basis) to indicate the primary purchase path within the user interface of the consumer device.

In some embodiments, prior to providing the promotion display with the interactive buy button for the primary purchase path, server 110 may be configured to determine whether the consumer is eligible for purchasing the promotion as a group promotion. For example, the underlying promotion may be defined as ineligible based on promotion data. In another example, the consumer may be ineligible, such as a consumer that has not registered or otherwise provided login data associated with a valid consumer account. In response to determining that the consumer and/or promotion is ineligible, server 110 may be configured to provide a promotion display without any group buying option.

At 2806, server 110 may be configured to determine whether consumer device input data indicating a selection of the interactive buy button within the promotion display has been received from the consumer device. For example, buy button 2904 of promotion display 2900 may be selected via a consumer device input such as a touch screen input, and the selection may be transmitted to server 110 via the network.

In response to determining that consumer device input data indicating a selection of the buy button within the promotion display has been received from the consumer device, method 2800 may proceed to 2808-2822, where server 110 may be configured to provide for consumer purchase of the promotion via the primary purchase path. Here, in addition to purchasing the promotion on an individual basis, server 110 may be further configured to initiate a group promotion and add the consumer account associated with the consumer device to a consumer group for the group promotion.

At 2808, server 110 may be configured to provide a checkout display to the consumer interface of the consumer device. FIG. 30 shows an example of a checkout display 3000 in accordance with some embodiments. Checkout display 3000 may be configured to allow the consumer to confirm purchase of the promotion, such as by providing a consumer input indicating selection of complete order button 3002. Checkout display 3000 may be further configured to allow the consumer to provide payment data, authorize a payment based on stored payment data on the consumer device or central system, and/or otherwise accepting the promotion. Checkout display 3000 may further indicate the availability of the group promotion and the parameters of the group promotion, such as at group promotion message 3004. For example, checkout display 300 may indicate a group sale threshold and/or a group discount. Group promotion message 3004 of checkout display 3000 may further indicate that the consumer will be refunded and/or credited with a group discount value when the group sale threshold has been satisfied if the consumer pays the purchase value of the promotion (e.g., by selecting complete order button 3002). In some embodiments, checkout display 3000 may further indicate a deadline or time limit by which the group sale threshold must be satisfied for the consumer group to receive the group discount (e.g., "If you and 2 more friends buy within X hours we will refund $6 to everyone's credit card.").

At 2810, server 110 may be configured to complete a purchase of the promotion at the purchase value of the promotion. As discussed above, the purchase value is the cost of purchasing the promotion on an individual basis, and may be defined by promotion data of the promotion stored within the system (e.g., within database 112). Furthermore, as part of the primary purchase path, server 110 may be configured to create a group promotion based on the purchased promotion, and to associate the consumer account with the group promotion. As discussed above, creating the group promotion may include generating a group promotion identifier and/or storing the group promotion identifier and related information in one or more databases 112.

At 2812, subsequent to completion of the purchase of the promotion, server 110 may be configured to provide a sharing channel display to the consumer interface. In some embodiments, the sharing channel display may further include a receipt display indicating a confirmation of the completion of the purchase. FIG. 31 shows an example of a sharing channel display 3100 in accordance with some embodiments. Sharing channel display 3100 may be configured to receive consumer inputs provided via the consumer device indicating sharing options or communication channels for sharing the group promotion. Some example communication channel may include email, one or more electronic social networks (e.g., messages via news feeds, wall posts, etc.), text message, mobile device application, etc.

In some embodiments, sharing channel display may be configured to provide a modal window in response to consumer selection of a communication channel within sharing channel display 3100. For example, selection of the email communication channel may result in creation of a mailto: link where the consumer may specify email addresses of the one or more other consumers. In another example, selection of a social network communication channel may result in the creation of a social networking modal window where the consumer may select connected friends and/or contacts.

At 2814, server 110 may be configured to receive a selection of a communication channel for sharing the group promotion from the consumer device. For example, the consumer may select one or more communication channels 3102, and may initiate sharing of the group promotion via the selected communication channel(s) by selecting share button 3104. In response, the consumer device may be configured to transmit communication channel data indicating a selected communication channel to server 110 via the network.

At 2816, server 110 may be configured to create an electronic reference for consumer device access to the group promotion. For example, the electronic reference may be a hyperlink that can be used by a web browser application on consumer devices to access the group promotion (e.g., a group promotion display as discussed below, a group discussion interface, etc.). In another example, the electronic reference may be a link to launch a mobile application that can access the group promotion. Advantageously, the electronic reference may provide access to the group promotion to any networked consumer device connected with server 110, and may be configured to persist for consumer access (e.g., until the group promotion has been redeemed). In some embodiments, the electronic reference may alternatively or additionally provide a link to a group discussion interface as discussed above, such as group discussion interface 1800 shown in FIG. 18. In some embodiments, the electronic reference may be an example of a group promotion identifier that uniquely identifies the group promotion.

2818, server 110 may be configured to create an impression of the group promotion compatible with the selected communication channel, the impression including the electronic reference. For example, where a social network communication channel is used, the impression may take the form of a feed item or other social network message. The feed item may include group promotion data, such as promotion-specific text such as "buy this deal with me and we can all get it for 75% off: [promotion name]." The feed item may further include an image associated with the promotion (e.g., as shown in FIG. 7 for promotion 702). In some embodiments, such as where a communication channel includes specifications (e.g., character limit), the impression may be configured accordingly (e.g., shortened title, abbreviations, acronyms, etc.). An email impression may also include similar text and image(s), with the data formatted for compatibility for email rather than as a social networking item. For example, an email impression may include data formatted within the subject line, body, etc. In another example, where SMS text message is used, the text message impression may include text and/or a hyperlink, and without the associated image(s). In some embodiments, when more than a single communication channel is selected, server 110 may generate a separate impression for each selected communication channel.

At 2820, server 110 may be configured to provide the impression including the electronic reference to the consumer device and/or one or more other consumer devices. In some embodiments, server 110 may be configured to provide the electronic reference directly to the consumer device for sharing with the one or more other consumers. For example, server 110 may be configured to provide the electronic reference to the consumer via the consumer interface, or using any suitable communication channel as discussed herein. Once received by the consumer device, the consumer is able to share the group promotion by sharing the electronic reference. For example, where the electronic reference is a uniform resource locator (URL) address, the consumer may copy and paste the electronic reference to an email, text message, social networking message, etc. The one or more other consumer devices that receive the electronic reference may then use the electronic reference to access the group promotion.

Advantageously, server 110 is capable of facilitating the sharing of the group promotion without requiring that the consumer define eligible participants during the primary purchase path, thereby increasing efficiency with respect to consumer input count for completing the networked electronic purchase and also stimulating consumer participation. In some embodiments, completion of the primary purchase path may be a two-click transaction, the first being a buy selection and the second being a confirmation selection (e.g., using stored payment data that does not need consumer reentry for each purchase). In another example, the primary purchase path may be a three-click transaction, the first being the buy selection, the second being the confirm selection, and the third being a communication channel selection for sharing the group promotion.

In some embodiments, server 110 may alternatively or additionally provide the electronic reference directly to the one or more other consumer devices via the network. The consumer interface may be configured to receive consumer inputs that specify contacts or friends for receiving the impression and/or electronic reference. Where the selected communication channel includes an electronic social network, the server may be configured to provide the electronic reference to consumer devices of users linked (e.g., friends, contacts, etc.) to the consumer via the social network as a feed item or other social networking message. In another example, as discussed above, the consumer may be allowed to specify contacts that are otherwise unaffiliated with any consumer account or social networking account, such as based on a phone number, email address, etc. In some embodiments, server 110 may alternatively or additionally provide the electronic reference to the one or more other consumer devices via a third party system, such as a third party social networking system when a social networking system communication channel is used.

At 2822, server 110 may be configured to provide promotion purchase confirmation and group promotion initiation communication to the consumer device via the network. The promotion purchase confirmation and group promotion initiation communication may be sent using one or more suitable communication channels (e.g., email, text message, mobile application alert/message, etc.), and may be sent as separate messages or combined within a single message. The promotion purchase confirmation may indicate the successful completion of the purchase of the promotion on an individual basis. The group promotion initiation communication may indicate that a group promotion based on the purchased promotion has been initiated and that the consumer has been added to the consumer group associated with the group promotion.

In some embodiments, the group promotion initiation communication may further include group promotion data. For example, the group promotion data may include the group discount, the group sale threshold, a time frame or deadline for an eligible purchase toward the group sale count (where applicable), etc. The group promotion display may include a header such as "Share with Friends to Receive your $6" and more detailed text such as "you've completed your order, but you're not done yet. Share the link below with your friends. If 3 buy within 72 hours we will refund $6 to everyone's credit card." The group promotion initiation communication may include the electronic reference, which may allow the consumer to view the progress of the group buying session, such as via a group promotion display and/or a group promotion discussion interface. In some embodiments, the group promotion initiation communication (or other display) may further include a disband group button (e.g., "I'm done sharing") which allows the consumer to cancel the group promotion and purchase the underlying promotion on an individual basis only.

Returning to 2806, in response to determining that consumer device input data indicating a selection of the buy button within the promotion display has not been received from the consumer device, method 2800 may proceed to 2824, where server 110 may be configured to initiate a secondary purchase path. For example, the secondary purchase path may include purchase the primary on an individual basis. Furthermore, a group promotion is not initiated, and the purchasing consumer is not included for membership within a consumer group for the group promotion. In some embodiments, the primary purchase path may include purchase of the promotion on an individual basis only and may be associated with a top button or most prominently displayed button of the consumer interface (e.g., promotion display 800), while creation of the group promotion may be a secondary action associated with a lower button or less prominently displayed button of the consumer interface. Method 2800 may then proceed to 2826 and end.

FIG. 32 shows an example of a method 3200 for providing a group promotion to a consumer group based on an electronic reference in accordance with some embodiments. As discussed in greater detail below, the use of the electronic reference may provide consumers with access to the group promotion without requiring consumers to register or otherwise access a consumer account. In some embodiments, the processes associated with adding additional consumers to the consumer group may be leveraged to expedite a consumer account registration process, thereby improving the efficiency of networked-based consumer device registration techniques.

Method 3200 may begin at 3202 and proceed to 3204, where server 110 may be configured to provide, via a network (e.g., network 104), an impression including an electronic reference to a consumer device for access to an ungated group promotion display. The discussion at 2820 of method 2800 may be applicable at 3204. For example, the consumer device may receive the impression and/or the electronic reference directly from server 110, from the consumer device that completed the initial primary purchase path, or from a third party system (e.g., a third party social networking system).

The consumer device may be the first consumer device that completed the primary purchase path, or alternatively, may be a subsequent consumer device associated with a second consumer that has yet to join the promotion group. The impression may be provided via any suitable communication channel, including a communication channel as indicated by consumer device via the sharing channel display. An "ungated group promotion display," as used herein, refers to a group promotion display that can be accessed without requiring consumer login or a consumer account. As such, any consumer device capable of using the electronic reference (e.g., with a web browser) may access the ungated group promotion display, even when the consumer device is unassociated with a consumer account. Advantageously, the system can provide for increased efficiency by reducing the number of consumer device inputs to complete the computer processing of group promotion data and universal consumer device access via use of the electronic reference (e.g., a hyperlink to a browser consumer interface).

At 3206, server 110 may be configured to receive an indication of the electronic reference from the consumer device via the network. For example, the selection of the electronic reference via the consumer interface may result in the consumer device sending a request to retrieve data located at a URL as defined by the electronic reference, and an indication of the electronic reference may be received by server 110 via the network. Additionally or alternatively, server 110 may be configured to receive an indication that the consumer device has received the electronic reference from the consumer device. Thus the electronic reference, in some embodiments, may also be a group promotion identifier that uniquely identifies the group promotion.

At 3208, server 110 may be configured to determine whether the group sale count is at a maximum consumer amount. As discussed above, the maximum consumer amount for a group promotion may define the maximum number of consumers that can be added to the consumer group for the group promotion, and the group sale count may indicate the number of consumers that have purchased the promotion as a group promotion. As such, when the group sale count is at the maximum consumer amount, server 110 may be configured to no longer accept additional consumers within the consumer group. As discussed in further detail below, when the consumer group is full, the consumer may be allowed to purchase the promotion on an individual basis and/or initiate a new group promotion (e.g., with a different consumer group) as discussed above in method 2800.

In response to determining that the group sale count is not at the maximum consumer amount, method 3200 may proceed to 3210, where server 110 may be configured to provide a consumer interface to the consumer device including the ungated group promotion display. FIG. 33 shows an example of an ungated group promotion display 3300 in accordance with some embodiments. Ungated group promotion display 3300 may be an example of a landing web page or other user interface that can be accessed via the electronic reference. Ungated group promotion display 3300 may include group promotion data 3302, share group promotion button 3304, login/register button 3306, and view deal button 3308. Group promotion data 3302 may include an indication of the details of the group promotion such as a promotion description, the group discount, the group sale threshold, the group sale count, etc.

In some embodiments, an ungated group promotion display may indicate a deadline wherein the group discount is no longer available to any consumers if the group sale threshold is not satisfied by the deadline. Here, the deadline may also be provided with group promotion data 3302 to incentivize more immediate consumer action. In some embodiments, the ungated group promotion display may provide different messages based on the progress of the consumer group towards the group sale threshold. For example, group promotion data 3302 may include an indication of the number of consumers that need to purchase the group promotion for the group sale count to satisfy the group sale threshold. The message may dynamically change based on the group sale count. As shown in ungated group promotion display 3300, a second consumer that receives the ungated group promotion display may receive a message such as "your friend has bought this deal. If you and 2 more friends buy within 18 hours we will refund $6 to everyone's credit card." In another example, a third consumer that receives the ungated group promotion display after two previous purchases by other consumers may receive a message such as "your friend has bought this deal. If you and 1 more friends buy within 18 hours we will refund $6 to everyone's credit." In some embodiments, the ungated group promotion display may include a special message when the consumer purchase count is nearing (e.g., 1 away) from the group sale threshold. For example, a consumer whose purchase would result in satisfaction of the group sale threshold may receive a message such as "three of your friends have bought this deal. Buy this deal now and we'll refund you and your friends $6 within 72 hours" or "three of your friends have bought this deal. Buy this deal now for only $30."

Share group promotion button 3304 may be configured to provide sharing of the group promotion with additional consumers. In response to the consumer selecting share group promotion button 3304, server 110 may be configured to provide a sharing channel display as discussed above. Login/register button 3306 may be configured to allow the consumer to provide login data or register with the system for consumer account creation. View deal button 3308 may be configured to allow the consumer to initiate purchase of the promotion.

In some embodiments, when the consumer device is a mobile device (e.g., a mobile phone), server 110 may be configured to provide an ungated group promotion display that is optimized for mobile displays and touch screen input devices. Some or all of the discussion regarding ungated group promotion display 3300 may be applicable to the mobile promotion display. In some embodiments, the mobile promotion display may be a simplified or stripped down version of a full website promotion display (e.g., promotion display 2800). For example, the mobile promotion display may not include a share group promotion button 3304, or the like. Furthermore, view deal button 3308 may indicate "view deal on website" and provide a link to a full website promotion display such as promotion display 2800.

At 3212, server 110 may be configured to provide a promotion display to the consumer interface in response to receiving consumer device input indicating selection of the view promotion button. The discussion above regarding promotion displays (e.g., promotion display 800 or 2900) may be applicable at 3212. Selection of the view promotion button may indicate consumer interest in purchasing the promotion.

At 3214, server 110 may be configured to perform one or more of steps 2806-2820 of method 2800. Thus steps 2806-2820, including the primary purchase path, may be performed for each consumer that purchases the promotion, such as by using buy button 2904 within promotion display 2900. Alternatively, the group promotion may be purchased using a secondary purchase path, such in response to the consumer selecting group promotion selection 804 rather than buy button 802, as shown in promotion display 800. Server 110 may determine whether the buy button 802 of the promotion display has been selected, and if so, may provide a checkout display to confirm the purchase. In some embodiments, server 110 may be further configured to provide the sharing channel display subsequent to the purchase confirmation to allow the consumer to share the group promotion with additional consumers via one or more communication channels. In some embodiments, server 110 may be configured to require the registration and/or login by the consumer prior to a successful purchase of the group promotion. Here, the group promotion may be used to incentivize consumer account activations or re-activations (e.g., from inactive accounts), in addition to increased promotion purchases.

At 3216, server 110 may be configured to increment the group sale count. As discussed above, the group sale count may be incremented for each consumer that joins the consumer group for the group promotion.

At 3218, server 118 may be configured to determine whether the group sale count satisfies the group sale threshold. The group sale threshold, as discussed above, may define the number purchases of the group promotion and/or agreements to purchase the group promotion that must be exceeded by members of the consumer group before a group discount and/or other incentive may be awarded.

In response to determining that the group sale count has satisfied the group sale threshold, method 3200 may proceed to 3220, where server 110 may be configured to perform steps 408-416 of method 400. Here, the group discount may be associated with each of the consumer accounts of the consumer group. Furthermore, consumers that have purchased the promotion for the purchase value may be provided the group discount as a credit and/or refund for at least a portion of the purchase value of the group promotion. In some embodiments, such as where consumer group eligibility has been predefined and/or where the maximum consumer amount has not been reached, unpurchased consumers (e.g., of a predefined consumer group or otherwise) may be provided with a discounted purchase price representing the purchase value less the credit and/or refund value.

At 3222, sever 110 may be configured to provide confirmation of a refund/discount message to each consumer device associated with the consumer group. The confirmation of a refund/discount message may be provided via any suitable communication discussed herein, and may indicate that the group sale threshold has been satisfied and that the group discount has been rewarded.

Returning to 3218, in response to determining that the group sale count fails to satisfy the group sale threshold, method 3200 may proceed to 3224, where server 110 may be configured to provide a promotion purchase confirmation to the consumer device. The discussion at 2822 of method 2800 may be applicable at 3218.

At 3226, server 110 may be configured to provide a group purchase message to one or more other consumer devices associated with the consumer group. The group purchase message may indicate that the new consumer has purchased the group promotion and has been added to the consumer group. The group promotion message may also indicate additional group promotion data, such as the group sale threshold and/or group discount, thereby providing for the tracking of progress toward the group sale threshold and incentivizing consumer activity. In some embodiments, server 110 may be further configured to provide a group discussion interface to consumer devices associated with each member of the consumer group as discussed above.

In some embodiments, a group promotion may include an expiration date or deadline wherein the group discount is no longer available to any members of the consumer group if the group sale threshold is not satisfied by the deadline. Here, server 110 may be configured to provide a message to each consumer account via any suitable communication channel indicating that the consumer group has failed to satisfy the group sale threshold and that the group discount is unavailable.

Returning to 3208, in response to determining that the group sale count is at the maximum consumer amount, method 3200 may proceed to 3228, where server 110 may be configured to provide a promotion display to the consumer device. As discussed above, the promotion display (e.g., promotion display 800 or 2900) may provide for the purchase of the promotion on an individual basis or as a group promotion. In some embodiments, server 110 may be configured to provide a warning message indicating that the group promotion is at the max consumer amount and/or otherwise unavailable. In another example, the warning message may be provided at the checkout display (e.g., checkout display 3000) subsequent to the initiation of consumer purchase of the promotion.

At 3230, server 110 may be configured to perform steps 2806-2824 of method 2800. Here, server 110 may be configured to provide for the primary purchase path that includes purchasing the promotion as a group promotion, creating a new group promotion based on the underlying purchased promotion, adding the consumer to the group promotion, etc. Thus when an existing group promotion has reached the maximum consumer amount, server 110 may allow additional consumers that are interested in the promotion as a group promotion to create a new group promotion. Method 3200 may then proceed to 3232 and end.

In some embodiments, server 110 may be configured to provide for the tracking of group promotion purchases, and may perform analytics directed to maximizing consumer engagement as measured by one or more of consumer account activations, consumer account re-activations, and/or increased promotion purchases. For example, the analytics may be used to determine optimal group sale thresholds, group discounts, etc. for the various underlying promotions offered by promotion and marketing system 102.

Server 110 may be configured to initiate a differential pricing test designed to facilitate understanding of the upper limits on the ability to increase engagement through group discounts. In an initial test, server 110 may be configured to test high group discounts, such as up to a 50% incremental group discount. The test may be performed on X group promotions at a Y maximum consumer amount for each group promotion. Here, if the Y maximum consumer amount is reached at the 50% group discount, then the group discount has likely cannibalized non-group discount sales, and the cost of the test may be determined as Z.

Some key measures of engagement may include number of promotions sold, bookings, revenue, activations, and re-activations under the group discount vs. the control for non-group promotions sold, bookings, revenue, activations, and re-activations. Server 110 may determine key measures such as: at what rate do consumers choose to use group promotion purchase option as opposed to promotion purchases on an individual basis and/or the number of group promotion views or sales per group promotion instance, and the rate at which group promotion purchases meet a minimum threshold. Furthermore, server 110 may be configured to determine based on the differential pricing test the level of consumer engagement with various features, the success rate of consumers in inducing friends to purchase group promotions, and/or the referral frequency of new consumer accounts vs. previously engaged consumer accounts. In that sense, server 110 may be configured to programmatically determine group promotion data to optimize various types of consumer engagement, or consumer engagement overall.

CONCLUSION

Many modifications and other embodiments will come to mind to one skilled in the art to which these embodiments pertain having the benefit of the teachings presented in the foregoing descriptions and the associated drawings. For example, the techniques discussed herein involving a providing group promotions may easily be extended to other contexts where goods, services, and/or experiences may be offered to groups of consumers. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system, comprising:
one or more servers including:
communication circuitry configured to connect with consumer devices via a network; and
processing circuitry configured to:
associate a group promotion identifier with a first consumer account associated with a first consumer device;
generate a group promotion event interface associated with the group promotion identifier, wherein the group promotion event interface is configured for access by and display at each of at least a first consumer device and each of one or more consumers device with which the group promotion identifier is provided;
provide, via the network, the group promotion identifier to the first consumer device, the group promotion identifier configured to be shared with at least a second consumer device via any one of a plurality of communication channels, and upon selection of the group promotion identifier, to access the group promotion event interface, via causing launch of an application specific to a promotion and marketing system or via a browser configured to navigate to a URL indicated by the group promotion identifier;
receive, via the network, an indication of the group promotion identifier from a second consumer device;
in response to receiving the group promotion identifier from the second consumer device:
determine a second consumer account associated with the second consumer device; and
provide access to the group promotion event interface to the second consumer account;
receive, via the network, a promotion purchase request from the second consumer device generated via consumer device inputs to the promotion event interface;
in response to receiving the promotion purchase request, transmit, via the network, a promotion purchase notification to one or more of the first consumer device and the second consumer device;
generate a group redemption time poll interface, the group redemption time poll interface configured to be displayed via a user interface at each of at least the first consumer device and the second consumer device,
wherein the group redemption time poll interface comprises a group redemption time poll and is configured to receive, separately, via input at the user interface, from each of the at least the first consumer device and the second consumer device, indicating a rank of one or more proposed group redemption times,
wherein the processing is further configured to:
receive, from the first consumer device via the network, an indication of first group redemption time data, indicating a first ranking of one or more proposed group redemption times generated via the group redemption time poll;
receive, from the second consumer device via the network, second group redemption time data generated via the group redemption time poll, indicating a second ranking of the one or more proposed group redemption times generated via the group redemption time poll; and
determine a group redemption time based at least in part on the first and second redemption time data, indicating the first ranking of the one or more proposed group redemption times generated via the group redemption time poll and the second ranking of the one or more proposed group redemption times generated via the group redemption time poll; and
provide an updated interface comprising the group redemption time to the group promotion event interface.

2. The system of claim 1, wherein the processing circuitry configured to transmit the promotion purchase notification to the one or more of the first consumer device and the second consumer device includes the processing circuitry being configured to provide the promotion purchase notification to the group promotion event interface.

3. The system of claim 2, wherein the processing circuitry configured to provide the promotion purchase notification to the group promotion event interface includes the processing circuitry being configured to provide the promotion purchase notification to a message feed of the group promotion event interface.

4. The system of claim 1, wherein the promotion purchase notification includes one or more of a group sale threshold, a group sale count, and a group discount value.

5. The system of claim 1, wherein the processing circuitry is further configured to provide one or more of consumer messages and group promotion status updates to a message feed of the group promotion event interface.

6. The system of claim 1, wherein:
the processing circuitry is configured to provide a consumer message received from the first consumer device via the network to a message feed of the group promotion event interface; and
the consumer message includes at least one of text data, image data, video data, and audio data.

7. The system of claim 1, wherein the processing circuitry configured to generate the group promotion event interface includes the processing circuitry being configured to generate the group promotion event interface configured to allow a consumer device to perform one or more of:
adding one or more consumers to a consumer group;
removing one or more consumers from the consumer group;
canceling a group promotion;
updating a group redemption time;
updating a proposed group redemption time; and
providing a group sale threshold.

8. The system of claim 1, wherein the processing circuitry is further configured to provide consumer account access to the group promotion event interface subsequent to lapse of a group redemption time.

9. The system of claim 1, wherein the group promotion identifier comprises an electronic reference to the promotion event interface.

10. A machine-implemented method, comprising:
associating, by processing circuitry of one or more servers connected with consumer devices via a network, a group promotion identifier with a first consumer account associated with a first consumer device;
generating, by the processing circuitry, a group promotion event interface associated with the group promotion identifier, wherein the group promotion event interface is configured for access by and display at each of least a first consumer device and each of one or more consumers device with which the group promotion identifier is provided;
providing, by the processing circuitry and via the network, the group promotion identifier to the first consumer device, the group promotion identifier configured to be shared with at least a second consumer device via any one of a plurality of communication channels, and upon selection of the group promotion identifier, to access the group promotion event interface, via causing launch of an application specific to a promotion and marketing system or via a browser configured to navigate to a URL indicated by the group promotion identifier;
receiving, by the processing circuitry and via the network, an indication of the group promotion identifier from a second consumer device;
in response to receiving the group promotion identifier from the second consumer device, and by the processing circuitry:
determining a second consumer account associated with the second consumer device; and
providing access to the group promotion event interface to the second consumer account;
receiving, by the processing circuitry, a promotion purchase request from the second consumer device generated via consumer device inputs to the promotion event interface;
in response to receiving the promotion purchase request, transmitting, by the processing circuitry and via the network, a promotion purchase notification to one or more of the first consumer device and the second consumer device; and
generating a group redemption time poll interface, the group redemption time poll interface configured to be displayed via a user interface at each of at least the first consumer device and the second consumer device,
wherein the group redemption time poll interface comprises a group redemption time poll is configured to receive, via input at the user interface, from each of the at least the first consumer device and the second consumer device, indicating a rank of one or more proposed group redemption times,
wherein determining the group redemption time comprises:
receiving, from the first consumer device via the network, an indication of first group redemption time data, indicating a first ranking of one or more proposed group redemption times generated via the group redemption time poll;
receiving, from the second consumer device via the network, second group redemption time data generated via the group redemption time poll, indicating a second ranking of the one or more proposed group redemption times generated via the group redemption time poll; and
determining a group redemption time based at least in part on the first and second redemption time data, indicating the first ranking of the one or more proposed group redemption times generated via the group redemption time poll and the second ranking of the one or more proposed group redemption times generated via the group redemption time poll; and
providing an updated interface comprising the group redemption time to the group promotion event interface.

11. The method of claim 10, wherein transmitting the promotion purchase notification to the one or more of the first consumer device and the second consumer device includes providing the promotion purchase notification to the group promotion event interface.

12. The method of claim 11, wherein providing the promotion purchase notification to the group promotion event interface includes providing the promotion purchase notification to a message feed of the group promotion event interface.

13. The method of claim 10, wherein transmitting the promotion purchase notification includes transmitting the promotion purchase notification including one or more of a group sale threshold, a group sale count, and a group discount value.

14. The method of claim 10 further comprising providing, by the processing circuitry, one or more of consumer messages and group promotion status updates to a message feed of the group promotion event interface.

15. The method of claim 10 further comprising providing, by the processing circuitry, a consumer message received from the first consumer device via the network to a message feed of the group promotion event interface and wherein the consumer message includes at least one of text data, image data, video data, and audio data.

16. The method of claim 10, wherein generating the group promotion event interface includes generating the group promotion event interface configured to allow a consumer device to perform one or more of:
 adding one or more consumers to a consumer group;
 removing one or more consumers from the consumer group;
 canceling a group promotion;
 updating a group redemption time;
 updating a proposed group redemption time; and
 providing a group sale threshold.

17. The method of claim 10 further including providing, by the processing circuitry, consumer account access to the group promotion event interface subsequent to lapse of a group redemption time.

18. The method of claim 10, wherein the group promotion identifier comprises an electronic reference to the promotion event interface.

* * * * *